US012647211B2

(12) United States Patent
Wu et al.

(10) Patent No.: US 12,647,211 B2
(45) Date of Patent: Jun. 2, 2026

(54) METHODS AND DEVICES FOR TRANSMITTING HYBRID AUTOMATIC REPEAT REQUEST-ACKNOWLEDGMENT INFORMATION

(71) Applicant: Apogee 5G Global, LLC, Plano, TX (US)

(72) Inventors: Lu Wu, Shanghai (CN); Xiaobo Zhang, Shanghai (CN)

(73) Assignee: Apogee 5G Global, LLC, Plano, TX (US)

( * ) Notice: Subject to any disclaimer, the term of this patent is extended or adjusted under 35 U.S.C. 154(b) by 423 days.

(21) Appl. No.: 17/962,498

(22) Filed: Oct. 8, 2022

(65) Prior Publication Data

US 2023/0042753 A1 Feb. 9, 2023

Related U.S. Application Data

(63) Continuation of application No. PCT/CN2021/087508, filed on Apr. 15, 2021.

(30) Foreign Application Priority Data

Apr. 17, 2020 (CN) .......................... 202010303494.6
Feb. 9, 2021 (CN) .......................... 202110175436.4

(51) Int. Cl.
*H04W 72/04* (2023.01)
*H04L 1/1812* (2023.01)
(Continued)

(52) U.S. Cl.
CPC ....... *H04L 1/1812* (2013.01); *H04W 72/0446* (2013.01); *H04W 72/0453* (2013.01); *H04W 72/23* (2023.01)

(58) Field of Classification Search
CPC ...................... H04W 72/0446; H04W 72/0453
See application file for complete search history.

(56) References Cited

U.S. PATENT DOCUMENTS

2019/0141727 A1* 5/2019 Si .......................... H04L 1/1896

FOREIGN PATENT DOCUMENTS

CN 109639398 A 4/2019
WO 2020006416 A1 1/2020

OTHER PUBLICATIONS

PUCCH structure in short-duration by NTT Docomo (Year: 2018).*
(Continued)

*Primary Examiner* — Pamit Kaur
(74) *Attorney, Agent, or Firm* — VOLPE KOENIG

(57) ABSTRACT

The present disclosure provides a method and device in a node for wireless communications. A first node receives N signaling groups in M time-frequency resource sets, and transmits a first information block in a first time-frequency resource block. The first information block comprises HARQ-ACKs associated with the N signaling groups; a first signaling group comprises a last signaling in the N signaling groups, the first signaling group is one of the N signaling groups, the N signaling groups are respectively used to determine N reference times, and a first reference time is one of the N reference times determined by the first signaling group; a target signaling group is used to determine the first time-frequency resource block, the target signaling is one of the N signaling groups, N is a positive integer greater than 1.

14 Claims, 5 Drawing Sheets

(51) Int. Cl.
    *H04W 72/0446*     (2023.01)
    *H04W 72/0453*     (2023.01)
    *H04W 72/23*     (2023.01)

(56)                References Cited

OTHER PUBLICATIONS

Search Report of International patent No. PCT/CN2021/087508 dated Jul. 8, 2021.
"PUCCH structure in NTT Docomo et al:short-duration", 3GPP Draft;R1-1807061 Short PUCCH, 3rd Generation Partnership Project(3GPP), Mobile Competence Centre May 12, 2018.
"UL control I enhancements for URLLC", 3GPP Draft; R1-1906328,3rd Generation Partnership Project(3GPP), Mobile Competence Centre May 13, 2019.
First Office Action of Chinese patent application No. CN202180013228.2 dated Feb. 7, 2024.
First Search Report of Chinese patent application No. CN202180013228.2 dated Feb. 6, 2024.
Third Generationh Partnership Project, "Technical Specification Group Radio Access Network; NR; Multiplexing and channel coding (Release 16)," 3GPP TS 38.212 V16.1.0 (Mar. 2020).
Third Generationh Partnership Project, "Technical Specification Group Radio Access Network; NR; Physical layer procedures for control (Release 16)," 3GPP TS 38.213 V16.1.0 (Mar. 2020).
Third Generationh Partnership Project, "Technical Specification Group Radio Access Network; NR; Physical layer procedures for control (Release 16)," 3GPP TS 38.214 V16.1.0 (Mar. 2020).
Third Generationh Partnership Project, "Technical Specification Group Radio Access Network; NR; NR and NG-RAN Overall Description; Stage 2 (Release 16)," 3GPP TS 38.300 V16.1.0 (Mar. 2020).
Third Generationh Partnership Project, "Technical Specification Group Radio Access Network; NR; Radio Resource Control (RRC) protocol specification (Release 16)," 3GPP TS 38.331 V16.1.0 (Mar. 2020).

* cited by examiner

100
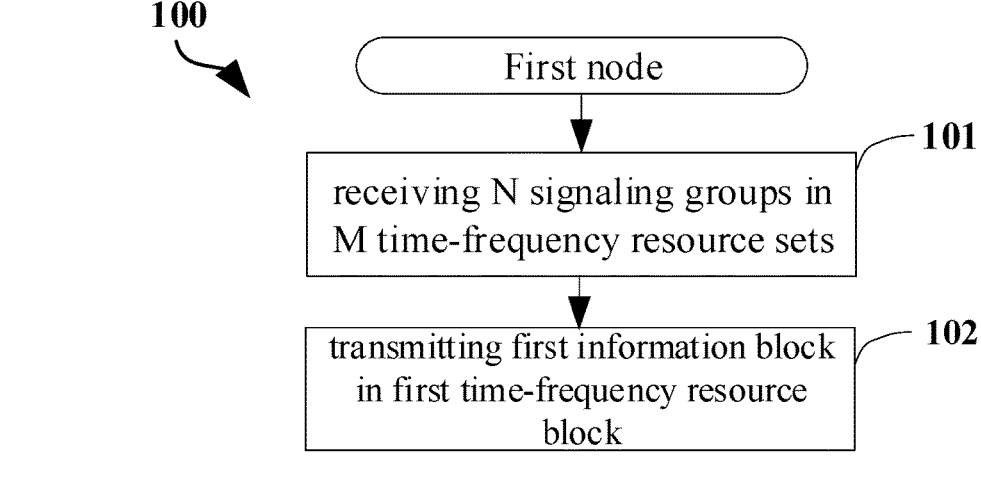
First node
↓
101
receiving N signaling groups in M time-frequency resource sets
↓
102
transmitting first information block in first time-frequency resource block
FIG.1
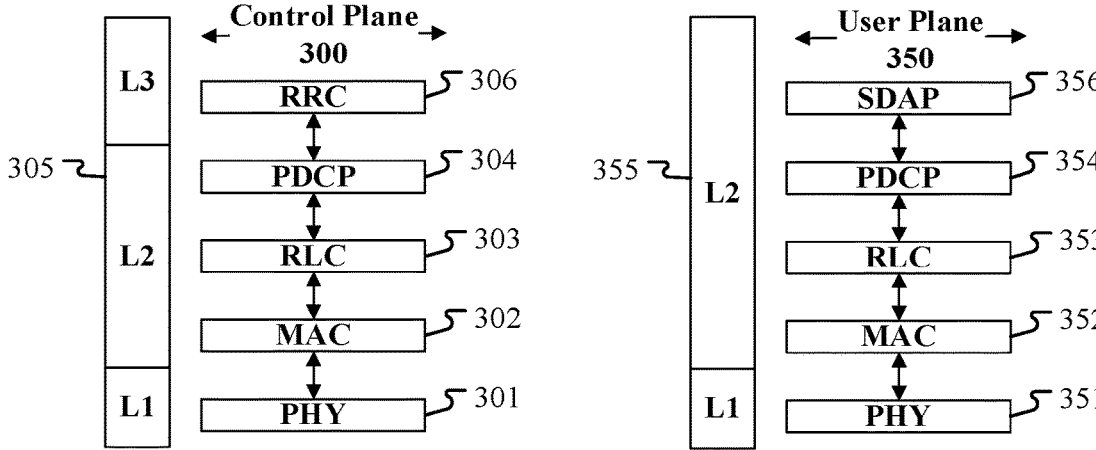
FIG.2
FIG.3

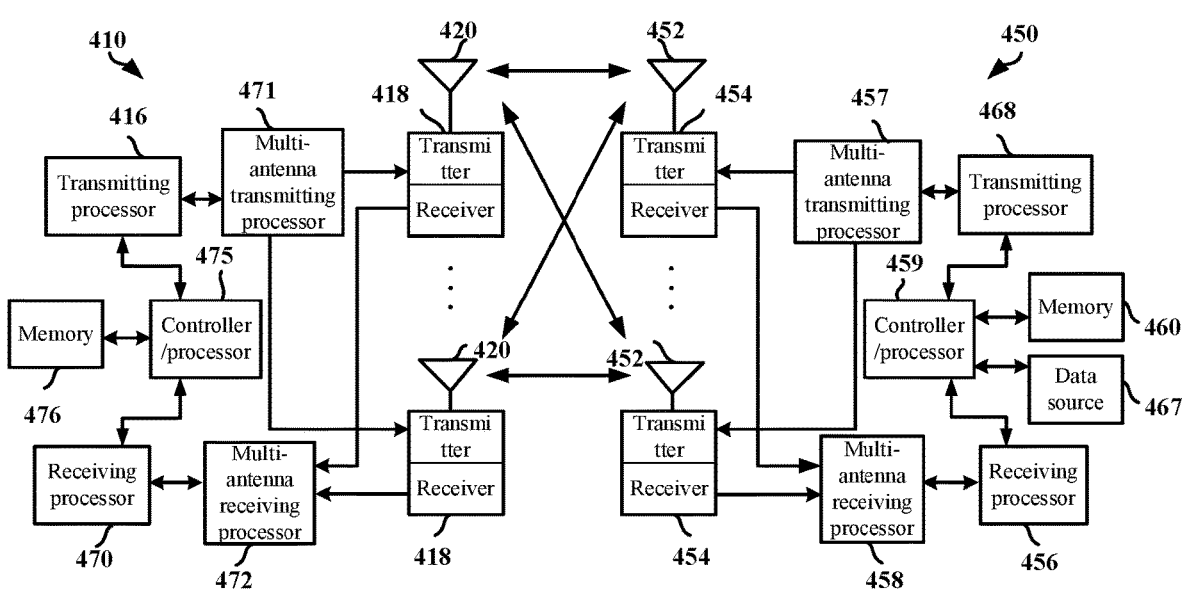

FIG. 4

```
N02.Second node                                      U01.First node

┌ ─ ─ ─ ─ ─ ─ ─ ─ ─ ─ ─ ─ ─ ─ ─ ─ ─ ─ ─ ─ ─ ─ ─ ─ ─ ┐
│  ┌─────────────────────────────────────────┐        │
│  │ S20.transmitting second information block│        │
│  └─────────────────────────────────────────┘        │        F1 Optional
│              ──────second information block──────▶   │
│                        ┌──────────────────────────────┐
│                        │S10.receiving second information block│
│                        └──────────────────────────────┘
└ ─ ─ ─ ─ ─ ─ ─ ─ ─ ─ ─ ─ ─ ─ ─ ─ ─ ─ ─ ─ ─ ─ ─ ─ ─ ┘

┌─────────────────────────────┐
│ S21.transmitting N signaling groups
│ in M time-frequency resource sets│
└─────────────────────────────┘
              ─────N signaling groups─────▶
                        ┌────────────────────────────┐
                        │ S11.receiving N signaling groups in
                        │ M time-frequency resource sets│
                        └────────────────────────────┘

┌─────────────────────────────┐
│ S22.transmitting K1 bit block set(s)│
└─────────────────────────────┘
              ─────K1 bit block set(s)─────▶
                        ┌──────────────────────────┐
                        │ S12.receiving K1 bit block set(s)│
                        └──────────────────────────┘

┌ ─ ─ ─ ─ ─ ─ ─ ─ ─ ─ ─ ─ ─ ─ ─ ─ ─ ─ ─ ─ ─ ─ ─ ─ ─ ┐
│                        ┌──────────────────────────────┐
│                        │ S13.transmitting first information block in
│                        │ first time-frequency resource block│
│                        └──────────────────────────────┘        F2 Optional
│  ◀─────first information block─────
│  ┌─────────────────────────────┐
│  │ S23.receiving first information
│  │ block in first time-frequency
│  │ resource block│
│  └─────────────────────────────┘
└ ─ ─ ─ ─ ─ ─ ─ ─ ─ ─ ─ ─ ─ ─ ─ ─ ─ ─ ─ ─ ─ ─ ─ ─ ─ ┘

( End )                                ( End )
```

FIG. 5

METHODS AND DEVICES FOR TRANSMITTING HYBRID AUTOMATIC REPEAT REQUEST-ACKNOWLEDGMENT INFORMATION

CROSS REFERENCE TO RELATED APPLICATIONS

This application is the continuation of the International Patent application No. PCT/CN2021/087508, filed on Apr. 15, 2021, which claims the priority benefit of Chinese Patent Application No. 202010303494.6, filed on Apr. 17, 2020, and claims the priority benefit of Chinese Patent Application No. 202110175436.4, filed on Feb. 9, 2021, the full disclosure of which is incorporated herein by reference.

BACKGROUND

Technical Field

The present disclosure relates to transmission methods and devices in wireless communication systems, and in particular to a method and device of radio signal transmission in wireless communication systems supporting cellular networks.

Related Art

In 3rd Generation Partner Project (3GPP) New Radio (NR) Rel-16 standard, repeat transmissions of PDSCHs under multiple Transmit-Receive Points (TRPs)/multiple antenna panels are supported to improve transmission reliability and robustness.

A work item (WI) of Multiple Input and Multiple Output (MIMO) enhancement of NR Release 17 was approved at 3GPP RAN #86 plenary. And improving reliability and robustness of channels other than the PDSCHs (such as PDCCHs, PUSCHs and PUCCHs) is a research focus.

SUMMARY

Inventors find through researches that repeat transmissions is a key technology to improve reliability and robustness of control channels. In this case, how to carry out Hybrid Automatic Repeat reQuest-Acknowledgment (HARQ-ACK) multiplexing and feedback is a key problem to be studied.

To address the above problem, the present disclosure provides a solution. In the description of the above problem, an Uplink is illustrated as an example. The present disclosure is also applicable to transmission scenarios of Downlink and Sidelink to achieve technical effects similar in Sidelink. Besides, a unified solution for different scenarios (including but not limited to Uplink, Downlink and Sidelink) can also help reduce hardware complexity and cost. It should be noted that the embodiments in a User Equipment (UE) in the present disclosure and characteristics of the embodiments may be applied to a base station if no conflict is incurred, and vice versa. And the embodiments in the present disclosure and the characteristics in the embodiments can be arbitrarily combined if there is no conflict.

In one embodiment, for interpretations of the terminology in the present disclosure, refer to definitions given in TS36 series of 3GPP specifications.

In one embodiment, for interpretations of the terminology in the present disclosure, refer to definitions given in TS38 series of 3GPP specifications.

In one embodiment, for interpretations of the terminology in the present disclosure, refer to definitions given in TS37 series of 3GPP specifications.

In one embodiment, for interpretations of the terminology in the present disclosure, refer to definitions given in Institute of Electrical and Electronics Engineers (IEEE) of 3GPP specifications.

The present disclosure provides a method in a first node for wireless communications, comprising:

receiving N signaling groups in M time-frequency resource sets; and transmitting a first information block in a first time-frequency resource block;

herein, the first information block comprises HARQ-ACKs associated with the N signaling groups; a first signaling group comprises a last signaling in the N signaling groups, the first signaling group is one of the N signaling groups, the N signaling groups are used to determine N reference times respectively, and a first reference time is one of the N reference times determined by the first signaling group; a target signaling group is used to determine the first time-frequency resource block, the target signaling group is one of the N signaling groups, and whether the first reference time is a latest one of the N reference times is used to determine whether the target signaling group is the first signaling group; when the first reference time is a latest one of the N reference times, the target signaling group is the first signaling group; when the first reference time is not a latest one of the N reference times, the target signaling group is not the first signaling group; M is a positive integer greater than 1, and N is a positive integer greater than 1.

In one embodiment, a problem to be solved in the present disclosure is: how to carry out HARQ-ACK multiplexing and feedback under repeat transmissions of a control channel.

In one embodiment, a problem to be solved in the present disclosure is: how to determine PUCCH resources used to transmit HARQ-ACK under repeat transmissions of a control channel.

In one embodiment, a problem to be solved in the present disclosure is: under repeat transmissions of a control channel, a last signaling does not necessarily carry last scheduling information, when the last signaling carries information scheduled earlier, time-frequency resources indicated by the last signaling are not time-frequency resources really used to transmit HARQ codebook; therefore, how to determine last scheduling information under repeat transmissions of a control channel is a key problem to be solved.

In one embodiment, the above method is essential in that N signaling groups respectively correspond to N scheduling information, one signaling group comprises repeat transmissions of same scheduling information, a first information block comprises HARQ codebooks obtained after HARQ-ACK multiplexing of N signaling groups, and a first time-frequency resource block is time-frequency resources transmitting HARQ codebooks; last scheduling information indicates time-frequency resources transmitting HARQ codebooks, and N reference times are used to determine the last scheduling information. The above method is advantageous in that when the last scheduling information is not carried by a last signaling, mistakenly using time-frequency resources indicated by the last signaling for transmitting HARQ codebooks is avoided, thus improving reliability and robustness of HARQ feedback.

In one embodiment, the above method is essential in that N signaling groups respectively correspond to N DCI scheduling, one signaling group comprises repeat transmissions of a PDCCH of same DCI, a first information block comprises HARQ codebooks obtained after HARQ-ACK multiplexing of N signaling groups, and a first time-frequency resource block is PUCCH resources transmitting HARQ codebooks; last DCI scheduling indicates PUCCH resources transmitting HARQ codebooks, and N reference times are used to determine the last DCI scheduling. The above method is advantageous in that when the last DCI scheduling is not carried by a last signaling, mistakenly using PUCCH resources indicated by the last signaling for transmitting HARQ codebooks is avoided, thus improving reliability and robustness of HARQ feedback.

According to one aspect of the present disclosure, the above method is characterized in that a target reference time is a latest one of the N reference times; when any reference time other than the target reference time in the N reference times is earlier than the target reference time, the target signaling group is one of the N signaling groups used to determine the target reference time; when each of N1 reference times in the N reference times is equal to the target reference time, the N1 reference times are respectively determined by N1 signaling groups in the N signaling groups, N1 first-type indexes are used to determine the target signaling group out of the N1 signaling groups, and the N1 first-type indexes respectively correspond to the N1 signaling groups; N1 is a positive integer greater than 1 and not greater than the N, and each of the N1 first-type indexes is a non-negative integer.

According to one aspect of the present disclosure, the above method is characterized in that the first information block comprises a first information sub-block set, N information sub-blocks comprise HARQ-ACKs associated with the N signaling groups respectively, any of the N information sub-blocks belongs to the first information sub-block set, and a number of information sub-blocks comprised in the first information sub-block set is not less than the N; the target signaling group is used to indicate the number of information sub-blocks comprised in the first information sub-block set.

According to one aspect of the present disclosure, the above method is characterized in that the target signaling group comprises S signalings, S being a positive integer greater than 1; any of the S signalings comprises a first field, the first field comprised in any of the S signalings indicates a first value, the first value is used to determine the number of information sub-blocks comprised in the first information sub-block set; the first value is a counter Downlink assignment index (DAT); and total DAIs respectively indicated by any two signalings belonging to a same one of M time windows in time domain in the N signaling groups are the same.

According to one aspect of the present disclosure, the above method is characterized in that counter DAIs respectively indicated by the S signalings are the same; total DAIs respectively indicated by any two signalings belonging to different time windows of the M time windows in time domain in the N signaling groups are different, and there exist two of the S signalings respectively belonging to different time windows of the M time windows.

According to one aspect of the present disclosure, the above method is characterized in that the M time-frequency resource sets respectively correspond to M reference times; the N signaling groups are respectively used to determine N time-frequency resource sets out of the M time-frequency resource sets, the N reference times are reference times corresponding to the N time-frequency resource sets in the M reference times.

According to one aspect of the present disclosure, the above method is characterized in comprising:
receiving a second information block;
herein, the second information block is used to determine the M time-frequency resource sets.

According to one aspect of the present disclosure, the above method is characterized in comprising:
receiving K1 bit block set(s);
herein, K1 signaling group(s) in the N signaling groups comprises (respectively comprise) scheduling information of the K1 bit block set(s), the HARQ-ACK(s) associated with the K1 signaling group(s) indicates (respectively indicate) whether the K1 bit block set(s) is(are) correctly received, K1 being a positive integer not greater than the N.

According to one aspect of the present disclosure, the method is characterized in that K2 signaling group(s) in the N signaling groups is (are respectively) used to indicate K2 Semi-Persistent Scheduling (SPS) Release(s), the HARQ-ACK(s) associated with the K2 signaling group(s) indicates (respectively indicate) whether the K2 signaling group(s) is(are) correctly received, K2 being a positive integer not greater than the N.

According to one aspect of the present disclosure, the method is characterized in that a given signaling group is one of the N signaling groups comprising more than one signaling, a given reference time is one of the N reference times determined by the given signaling group; a t1-th signaling in the given signaling group is used to determine the given reference time, t1 being a positive integer; the t1 is related to a capability of the first node, or, the t1 is related to a priority of the given signaling group.

The present disclosure provides a method in a second node for wireless communications, comprising:
transmitting N signaling groups in M time-frequency resource sets; and
receiving a first information block in a first time-frequency resource block;
herein, the first information block comprises HARQ-ACKs associated with the N signaling groups; a first signaling group comprises a last signaling in the N signaling groups, the first signaling group is one of the N signaling groups, the N signaling groups are used to determine N reference times respectively, and a first reference time is one of the N reference times determined by the first signaling group; a target signaling group is used to determine the first time-frequency resource block, the target signaling group is one of the N signaling groups, and whether the first reference time is a latest one of the N reference times is used to determine whether the target signaling group is the first signaling group; when the first reference time is a latest one of the N reference times, the target signaling group is the first signaling group; when the first reference time is not a latest one of the N reference times, the target signaling group is not the first signaling group; M is a positive integer greater than 1, and N is a positive integer greater than 1.

According to one aspect of the present disclosure, the above method is characterized in that a target reference time is a latest one of the N reference times; when any reference time other than the target reference time in the N reference times is earlier than the target reference time, the target signaling group is one of the N signaling groups used to determine the target reference time; when each of N1 reference times in the N reference times is equal to the target reference time, the N1 reference times are respectively determined by N1 signaling groups in the N signaling groups, N1 first-type indexes are used to determine the target signaling group out of the N1 signaling groups, and the N1 first-type indexes respectively correspond to the N1 signaling groups; N1 is a positive integer greater than 1 and not greater than the N, and each of the N1 first-type indexes is a non-negative integer.

According to one aspect of the present disclosure, the above method is characterized in that the first information block comprises a first information sub-block set, N information sub-blocks comprise HARQ-ACKs associated with the N signaling groups respectively, any of the N information sub-blocks belongs to the first information sub-block set, and a number of information sub-blocks comprised in the first information sub-block set is not less than the N; the target signaling group is used to indicate the number of information sub-blocks comprised in the first information sub-block set.

According to one aspect of the present disclosure, the above method is characterized in that the target signaling group comprises S signalings, S being a positive integer greater than 1; any of the S signalings comprises a first field, the first field comprised in any of the S signalings indicates a first value, the first value is used to determine the number of information sub-blocks comprised in the first information sub-block set; the first value is a counter DAI; and total DAIs respectively indicated by any two signalings belonging to a same one of M time windows in time domain in the N signaling groups are the same.

According to one aspect of the present disclosure, the above method is characterized in that counter DAIs respectively indicated by the S signalings are the same; total DAIs respectively indicated by any two signalings belonging to different time windows of the M time windows in time domain in the N signaling groups are different, and there exist two of the S signalings respectively belonging to different time windows of the M time windows.

According to one aspect of the present disclosure, the above method is characterized in that the M time-frequency resource sets respectively correspond to M reference times; the N signaling groups are respectively used to determine N time-frequency resource sets out of the M time-frequency resource sets, the N reference times are reference times corresponding to the N time-frequency resource sets in the M reference times.

According to one aspect of the present disclosure, the above method is characterized in comprising:

transmitting a second information block;
herein, the second information block is used to determine the M time-frequency resource sets.

According to one aspect of the present disclosure, the above method is characterized in comprising:

transmitting K1 bit block set(s);
herein, K1 signaling group(s) in the N signaling groups comprises (respectively comprise) scheduling information of the K1 bit block set(s), the HARQ-ACK(s) associated with the K1 signaling group(s) indicates (respectively indicate) whether the K1 bit block set(s) is(are) correctly received, K1 being a positive integer not greater than the N.

According to one aspect of the present disclosure, the method is characterized in that K2 signaling group(s) in the N signaling groups is (are respectively) used to indicate K2 SPS Release(s), the HARQ-ACK(s) associated with the K2 signaling group(s) indicates (respectively indicate) whether the K2 signaling group(s) is(are) correctly received, K2 being a positive integer not greater than the N.

According to one aspect of the present disclosure, the method is characterized in that a given signaling group is one of the N signaling groups comprising more than one signaling, a given reference time is one of the N reference times determined by the given signaling group; a t1-th signaling in the given signaling group is used to determine the given reference time, t1 being a positive integer; the t1 is related to a capability of a transmitting node of the first information block, or, the t1 is related to a priority of the given signaling group.

The present disclosure provides a first node for wireless communications, comprising:

a first receiver, which receives N signaling groups in M time-frequency resource sets; and
a first transmitter, which transmits a first information block in a first time-frequency resource block;
herein, the first information block comprises HARQ-ACKs associated with the N signaling groups; a first signaling group comprises a last signaling in the N signaling groups, the first signaling group is one of the N signaling groups, the N signaling groups are used to determine N reference times respectively, and a first reference time is one of the N reference times determined by the first signaling group; a target signaling group is used to determine the first time-frequency resource block, the target signaling group is one of the N signaling groups, and whether the first reference time is a latest one of the N reference times is used to determine whether the target signaling group is the first signaling group; when the first reference time is a latest one of the N reference times, the target signaling group is the first signaling group; when the first reference time is not a latest one of the N reference times, the target signaling group is not the first signaling group; M is a positive integer greater than 1, and N is a positive integer greater than 1.

The present disclosure provides a second node for wireless communications, comprising:

a second transmitter, which transmits N signaling groups in M time-frequency resource sets; and
a second receiver, which receives a first information block in a first time-frequency resource block;
herein, the first information block comprises HARQ-ACKs associated with the N signaling groups; a first signaling group comprises a last signaling in the N signaling groups, the first signaling group is one of the N signaling groups, the N signaling groups are used to determine N reference times respectively, and a first reference time is one of the N reference times determined by the first signaling group; a target signaling group is used to determine the first time-frequency resource block, the target signaling group is one of the N signaling groups, and whether the first reference time is a latest one the N reference times is used to determine whether the target signaling group is the first signaling group; when the first reference time is a latest one of the N reference times, the target signaling group is the first signaling group; when the first reference time is not a latest one of the N reference times, the target signaling group is not the first signaling group; M is a positive integer greater than 1, and N is a positive integer greater than 1.

In one embodiment, the method in the present disclosure is advantageous in the following aspects:

by adopting the method proposed in the present disclosure, under repeat transmissions of a control channel, reliability of HARQ-ACK multiplexing and feedback can be better guaranteed;

by adopting the method proposed in the present disclosure, under repeat transmissions of control channel, PUCCH resources transmitting HARQ-ACK can be determined more reliably;

by adopting the method proposed in the present disclosure, under repeat transmissions of control channel, last scheduling information can be determined more reliably;

by adopting the method proposed in the present disclosure, when a last signaling does not carry last scheduling information, mistakenly using time-frequency resources indicated by a last signaling for transmitting HARQ codebooks is avoided, thus improving reliability and robustness of HARQ feedback.

BRIEF DESCRIPTION OF THE DRAWINGS

Other features, objects and advantages of the present disclosure will become more apparent from the detailed description of non-restrictive embodiments taken in conjunction with the following drawings:

FIG. 1 illustrates a flowchart of N signaling groups and a first information block according to one embodiment of the present disclosure.

FIG. 2 illustrates a schematic diagram of a network architecture according to one embodiment of the present disclosure.

FIG. 3 illustrates a schematic diagram of a radio protocol architecture of a user plane and a control plane according to one embodiment of the present disclosure.

FIG. 4 illustrates a schematic diagram of a first communication device and a second communication device according to one embodiment of the present disclosure.

FIG. 5 illustrates a flowchart of radio signal transmission according to one embodiment of the present disclosure.

DESCRIPTION OF THE EMBODIMENTS

Figures 6, 7:
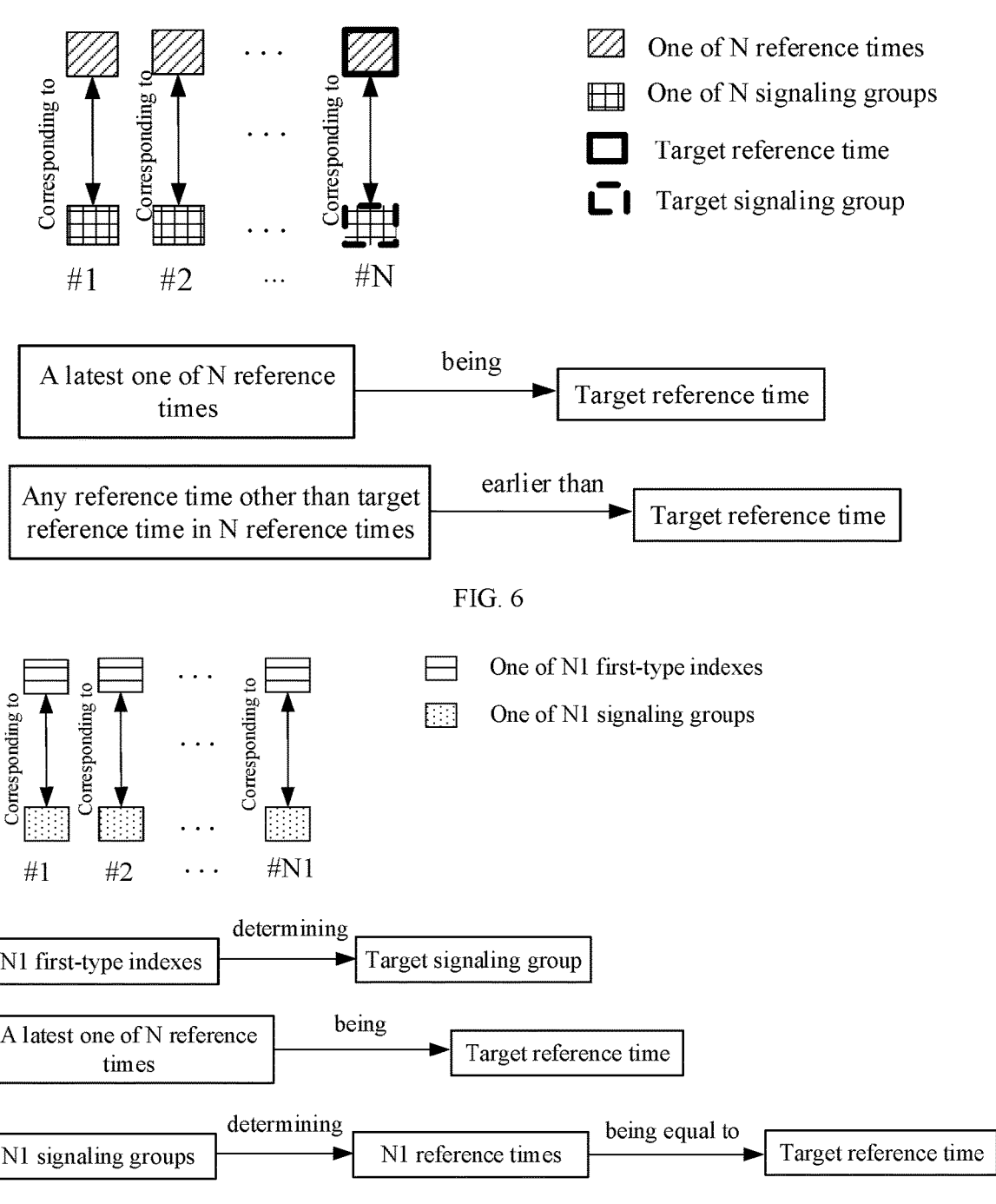
FIG. 6 illustrates a schematic diagram of determining a target signaling group according to one embodiment of the present disclosure.
FIG. 7 illustrates a schematic diagram of determining a target signaling group according to another embodiment of the present disclosure.

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Embodiment 1 illustrates a flowchart of N signaling groups and a first information block according to one embodiment of the present disclosure, as shown in FIG. 1. In FIG. 1, each box represents a step. Particularly, the sequential order of steps in these boxes does not necessarily mean that the steps are chronologically arranged.

In Embodiment 1, the first node in the present disclosure receives N signaling groups in M time-frequency resource sets in step 101; transmits a first information block in a first time-frequency resource block in step 102; herein, the first information block comprises HARQ-ACKs associated with the N signaling groups; a first signaling group comprises a last signaling in the N signaling groups, the first signaling group is one of the N signaling groups, the N signaling groups are used to determine N reference times respectively, and a first reference time is one of the N reference times determined by the first signaling group; a target signaling group is used to determine the first time-frequency resource block, the target signaling group is one of the N signaling groups, and whether the first reference time is a latest one of the N reference times is used to determine whether the target signaling group is the first signaling group; when the first reference time is a latest one of the N reference times, the target signaling group is the first signaling group; when the first reference time is not a latest one of the N reference times, the target signaling group is not the first signaling group; M is a positive integer greater than 1, and N is a positive integer greater than 1.

In one embodiment, any of the M time-frequency resource sets comprises a monitoring occasion in time domain.

In one embodiment, any of the M time-frequency resource sets comprises at least one monitoring occasion in time domain.

In one embodiment, one of the M time-frequency resource sets comprises multiple monitoring occasions in time domain.

In one embodiment, a number of monitoring occasion(s) comprised in any of the M time-frequency resource set in time domain is(are) configured by a higher-layer signaling.

In one embodiment, any of the M time-frequency resource sets comprises at least one search space.

In one embodiment, any of the M time-frequency resource sets comprises at least one Physical Downlink Control CHannel (PDCCH) candidate.

In one embodiment, the specific definition of the monitoring occasion can be found in 3GPP TS38.213, section 9.1.

In one embodiment, any of the M time-frequency resource sets comprises at least one Resource Element (RE).

In one embodiment, any of the M time-frequency resource sets comprises at least one multi-carrier symbol in time domain.

In one embodiment, any of the M time-frequency resource sets comprises at least one single carrier symbol in time domain.

In one embodiment, any of the M time-frequency resource sets comprises at least one Resource Block (RB) in frequency domain.

In one embodiment, any of the M time-frequency resource sets comprises at least one sub-carrier in frequency domain.

In one embodiment, the M time-frequency resource sets belong to at least one serving cell.

In one embodiment, the M time-frequency resource sets belong to at least one Bandwidth Part (BWP) in frequency domain.

In one embodiment, the M time-frequency resource sets belong to a same serving cell.

In one embodiment, the M time-frequency resource sets belong to a same BWP in frequency domain.

In one embodiment, there exist two time-frequency resource sets in the M time-frequency resource sets respectively belonging to two serving cells.

In one embodiment, there exist two time-frequency resource sets in the M time-frequency resource sets respectively belonging to two BWPs.

In one embodiment, a given time-frequency resource set is any of the M time-frequency resource set, and the given time-frequency resource set belongs to a BWP in frequency domain.

In one embodiment, a given time-frequency resource set is any of the M time-frequency resource set, and the given time-frequency resource set belongs to a serving cell.

In one embodiment, the multicarrier symbol is an Orthogonal Frequency Division Multiplexing (OFDM) symbol.

In one embodiment, the multicarrier symbol is a Single Carrier-Frequency Division Multiple Access (SC-FDMA) symbol.

In one embodiment, the multicarrier symbol is a Discrete Fourier Transform Spread OFDM (DFT-S-OFDM) symbol.

In one embodiment, the multicarrier symbol is a Filter Bank Multi Carrier (FBMC) symbol.

In one embodiment, the multicarrier symbol comprises a Cyclic Prefix (CP).

In one embodiment, time-domain resources occupied by any signaling in the N signaling groups belong to a monitoring occasion.

In one embodiment, time-domain resources occupied by any two signalings in the N signaling groups respectively belong to two monitoring occasions.

In one embodiment, time-domain resources occupied by any of the N signaling groups belong to a monitoring occasion.

In one embodiment, time-domain resources occupied by any two signalings belonging to a same one of the N signaling groups belong to a same monitoring occasion.

In one embodiment, any two signalings belonging to a same one of the N signaling groups belong to a same serving cell.

In one embodiment, any of the N signaling groups comprises at least one signaling.

In one embodiment, the target signaling group only comprises one signaling.

In one embodiment, the target signaling group comprises S signalings, S being a positive integer greater than 1.

In one subembodiment of the above embodiment, each of the S signalings comprises same DCI.

In one subembodiment of the above embodiment, the S signalings are S repeat transmissions of same DCI.

In one subembodiment of the above embodiment, the S signalings are S repeat transmissions of a PDCCH.

In one subembodiment of the above embodiment, the S signalings are used to indicate a same SPS Release.

In one subembodiment of the above embodiment, the S signalings are used to schedule a same Transport Block (TB).

In one subembodiment of the above embodiment, the S signalings are used to schedule a same Code block group (CBG).

In one subembodiment of the above embodiment, each of the S signalings comprises a same first-type information block.

In one embodiment, the first-type information block comprises DCI.

In one embodiment, the first-type information block comprises partial fields of DCI.

In one embodiment, the first-type information block comprises a Hybrid Automatic Repeat reQuest (HARQ) Process Number.

In one embodiment, the first-type information block comprises a Downlink assignment index (DAI).

In one embodiment, the first-type information block comprises a New data indicator (NDI).

In one embodiment, the first-type information block comprises an HARQ Process Number, a DAI and an NDI.

In one embodiment, any signaling in the N signaling groups is a physical-layer signaling.

In one embodiment, any signaling in the N signaling groups is dynamically configured.

In one embodiment, any signaling in the N signaling groups is a Downlink Control Information (DCI) signaling.

In one embodiment, any signaling in the N signaling groups is transmitted on a downlink physical layer control channel (i.e., a downlink channel that is only capable of carrying a physical layer signaling).

In one embodiment, any signaling in the N signaling groups schedules a Physical Downlink Shared Channel (PDSCH) reception or an SPS PDSCH release.

In one embodiment, any signaling in the N signaling groups is a first-type signaling.

In one subembodiment of the above embodiment, the first-type signaling schedules a PDSCH reception or an SRS PDSCH release.

In one subembodiment of the above embodiment, the first-type signaling schedules a PDSCH reception.

In one subembodiment of the above embodiment, the first-type signaling schedules an SPS PDSCH release.

In one subembodiment of the above embodiment, the first-type signaling is used to indicate an SPS release.

In one subembodiment of the above embodiment, the first-type signaling is used to schedule a downlink physical layer data channel.

In one embodiment, the downlink physical-layer control channel is a PDCCH.

In one embodiment, the downlink physical-layer control channel is a short PDCCH (sPDCCH).

In one embodiment, the downlink physical-layer control channel is a Narrow Band PDCCH (NB-PDCCH).

In one embodiment, the downlink physical-layer data channel is a PDSCH.

In one embodiment, the downlink physical-layer data channel is a short PDSCH (sPDSCH).

In one embodiment, the downlink physical layer data channel is a Narrow Band PDSCH (NB-PDSCH).

In one embodiment, N is not greater than the M.

In one embodiment, the N signaling groups comprise T1 signalings, T1 time-frequency resource sets in the M time-frequency resource sets respectively comprise time-frequency resources occupied by the T1 signalings, T1 being a positive integer not less than the N and not greater than the M.

In one embodiment, N time-frequency resource sets in the M time-frequency resource sets respectively comprise time-frequency resources occupied by the N signaling groups.

In one embodiment, the M time-frequency resource sets comprise T2 time-frequency resource groups, T2 being a positive integer not less than the M; the N signaling groups comprise T1 signalings, T1 time-frequency resource groups in the T2 time-frequency resource groups respectively comprise time-frequency resources occupied by the T1 signalings, T1 being a positive integer not less than the N and not greater than the T2.

In one embodiment, a given signaling group is any of the N signaling groups, a given time-frequency resource set is one of the M time-frequency resource set comprising time-frequency resources occupied by the given signaling group, and the given time-frequency resource set comprises at least one time-frequency resource group.

In one subembodiment of the above embodiment, a number of time-frequency resource groups comprised in the given time-frequency resource set is not less than a number of signalings comprised in the given signaling group.

In one subembodiment of the above embodiment, a number of time-frequency resource groups comprised in the given time-frequency resource set is equal to a number of signalings comprised in the given signaling group.

In one subembodiment of the above embodiment, time-frequency resources occupied by any signaling in the given signaling group belong to a time-frequency resource group in the given time-frequency resource set.

In one embodiment, the first time-frequency resource block comprises a Physical Uplink Control CHannel (PUCCH) resource.

In one embodiment, the first time-frequency resource block is used to control information transmission.

In one embodiment, the first time-frequency resource block comprises at least one RE.

In one embodiment, the first time-frequency resource block comprises at least one multi-carrier symbol in time domain.

In one embodiment, the first time-frequency resource block comprises at least one single carrier symbol in time domain.

In one embodiment, the first time-frequency resource block comprises at least one RB in frequency domain.

In one embodiment, any two signalings in the N signaling groups are used to determine a same time unit, and the first time-frequency resource block belongs to the same time unit in time domain.

In one embodiment, the time unit comprises at least one multi-carrier symbol.

In one embodiment, the time unit comprises a slot.

In one embodiment, the time unit comprises a subframe.

In one embodiment, time-frequency resources occupied by the target signaling group are used to determine the first time-frequency resource block.

In one embodiment, time-frequency resources occupied by a signaling in the target signaling group are used to determine the first time-frequency resource block.

In one embodiment, time-frequency resources occupied by an earliest signaling in the target signaling group are used to determine the first time-frequency resource block.

In one embodiment, a first CCE occupied by an earliest signaling in the target signaling group are used to determine the first time-frequency resource block.

In one embodiment, the target signaling group is used to indicate the first time-frequency resource block.

In one embodiment, the target signaling group explicitly indicates the first time-frequency resource block.

In one embodiment, the target signaling group implicitly indicates the first time-frequency resource block.

In one embodiment, an earliest signaling in the target signaling group is used to indicate the first time-frequency resource block.

In one embodiment, each signaling in the target signaling group is used to indicate the first time-frequency resource block.

In one embodiment, the target signaling group only comprises a signaling, the target signaling group comprises a second field, and the second field comprised in the target signaling group is used to indicate the first time-frequency resource block.

In one embodiment, the target signaling group comprises S signalings, S being a positive integer greater than 1; any of the S signalings comprises a second field, a value of the second field comprised in any of the S signalings is equal to a second value, and the second value is used to indicate the first time-frequency resource block.

In one embodiment, any signaling in the target signaling group comprises a second field, and the second field comprised in any signaling in the target signaling group is used to indicate the first time-frequency resource block.

In one embodiment, the second field is a PUCCH resource indicator field, and the specific definition of the PUCCH resource indicator can be found in 3GPP TS38.212, section 7.3.1.2.

In one embodiment, the second field comprises at least one bit.

In one embodiment, the second field comprises 3 bits.

In one embodiment, the first time-frequency resource block belongs to a time unit in time domain, and the time unit to which the first time-frequency resource block belongs in time domain is used to determine the M time-frequency resource sets.

In one embodiment, a first time unit is a time unit to which the first time-frequency resource block belongs in time domain, and an HARQ-ACK associated with any signaling received on a time-frequency resource other than the M time-frequency resource sets is not fed back in the first time unit.

In one embodiment, the first information block comprises Uplink Control Information (UCI).

In one embodiment, the first information block only comprises an HARQ-ACK.

In one embodiment, the first information block comprises an HARQ-ACK and Channel State Information (CSI).

In one embodiment, the first information block comprises an HARQ-ACK and a Scheduling Request (SR).

In one embodiment, the first information block comprises an HARQ-ACK, CSI and an SR.

In one embodiment, a given signaling group is any of the N signaling groups.

In one subembodiment of the above embodiment, the HARQ-ACK associated with the given signaling group comprises a ACK.

In one subembodiment of the above embodiment, the HARQ-ACK associated with the given signaling group comprises a NACK.

In one subembodiment of the above embodiment, the HARQ-ACK associated with the given signaling group comprises a ACK or a NACK.

In one subembodiment of the above embodiment, the given signaling group is used to schedule a downlink physical-layer data channel, and the HARQ-ACK associated with the given signaling group indicates whether the downlink physical-layer data channel scheduled by the given signaling group is correctly received.

In one subembodiment of the above embodiment, the given signaling group is used to schedule a PDSCH reception, and the HARQ-ACK associated with the given signaling group indicates whether the PDSCH scheduled by the given signaling group is correctly received.

In one subembodiment of the above embodiment, the HARQ-ACK associated with the given signaling group indicates whether a bit block set scheduled by the given signaling group is correctly received.

In one subembodiment of the above embodiment, the given signaling group is used to indicate an SPS Release, and the HARQ-ACK associated with the given signaling group indicates whether the given signaling group is correctly received.

In one subembodiment of the above embodiment, the given signaling group is used to schedule an SPS PDSCH Release, and the HARQ-ACK associated with the given signaling group indicates whether the given signaling group is correctly received.

In one embodiment, the last signaling in the N signaling group is a latest detected signaling in the N signaling groups.

In one embodiment, signalings in the N signaling groups are arranged according to a first rule, and the last signaling in the N signaling groups is a signaling arranged in the last in the N signaling groups.

In one embodiment, signalings in the N signaling groups are indexed according a first rule, and the last signaling in the N signaling groups is a signaling with a largest index in the N signaling groups.

In one embodiment, the M time-frequency resource sets are arranged according to a first rule, and the last signaling in the N signaling groups is a signaling belonging to a time-frequency resource set arranged in the last in the N signaling groups.

In one embodiment, the M time-frequency resource sets are indexed according to a first rule, and the last signaling in the N signaling groups is a signaling belonging to a time-frequency resource set with a largest index in the N signaling groups.

In one embodiment, the M time-frequency resource sets comprise T2 time-frequency resource groups, T2 being a positive integer not less than M, the T2 time-frequency resource groups are arranged according to a first rule, and the last signaling in the N signaling groups is a signaling belonging to a time-frequency resource group arranged in the last in the N signaling groups.

In one embodiment, the M time-frequency resource sets comprise T2 time-frequency resource groups, T2 being a positive integer not less than M, the T2 time-frequency resource groups are indexed according to a first rule, and the last signaling in the N signaling groups is a signaling belonging to a time-frequency resource group with a largest index in the N signaling groups.

In one embodiment, in the N signaling groups, indexes of signalings arranged in the front are smaller, and indexes of signalings arranged in the back are larger.

In one embodiment, the N signaling groups comprise T1 signalings arranged from front to back in order, T1 being a positive integer not less than N, and indexes of the T1 signalings arranged from front to back in order are 0, 1, . . . , T1−1.

In one embodiment, the N signaling groups comprise T1 signalings arranged from front to back in order, T1 being a positive integer not less than N, and indexes of the T1 signalings arranged from front to back in order are 1, 2, . . . , T1.

In one embodiment, the first rule is related to occupied frequency-domain resources and occupied time-domain resources.

In one embodiment, the first rule is related to a serving cell to which it belongs and a monitoring occasion.

In one embodiment, the first rule is related to a serving cell to which it belongs, a monitoring occasion and a Control resource set (CORESET).

In one embodiment, the first rule comprises: first according to indexes of serving cells in an ascending order, and then according to indexes of monitoring occasions in an ascending order.

In one embodiment, the first rule comprises: first according to indexes of serving cells in an ascending order, and then according to an ascending chronological order.

In one embodiment, the first rule comprises: for a same monitoring occasion, in a serving cell, a first CORESET is arranged prior to a second CORESET.

In one embodiment, the first rule comprises: first, for start times of same search space sets, arranged according to indexes of serving cells in an ascending order; then, arranged according to start times of search space sets in an ascending order.

In one embodiment, the first rule comprises: for start times of same search space sets, in a serving cell, a first CORESET is arranged prior to a second CORESET.

In one embodiment, the first rule comprises: for a same time, in a serving cell, a first CORESET is arranged prior to a second CORESET.

In one embodiment, the first CORESET is a CORESET not configured with a CORESETPoolIndex or a configured CORESETPoolIndex equal to 0, and the second CORESET is a CORESET with a configured CORESETPoolIndex equal to 1.

In one embodiment, specific meanings of the first CORESET and the second CORESET can be found in 3GPP TS38.213, section 9.1.

In one embodiment, start times of the N signaling groups are respectively used to determine N reference times.

In one embodiment, the N reference times are respectively start times of the N signaling groups.

In one embodiment, the N reference times are respectively start slots of the N signaling groups.

In one embodiment, the N reference times are respectively start times of starting slots of the N signaling groups.

In one embodiment, the N reference times respectively belong to start slots of the N signaling groups.

In one embodiment, the N signaling groups are respectively used to determine N time-frequency resource sets out of the M time-frequency resource sets, and the N time-frequency resource sets are respectively used to determine N reference times.

In one embodiment, the N signaling groups are respectively used to determine N time windows, and the N time windows are respectively used to determine N reference times.

In one embodiment, a given signaling group is one of the N signaling groups comprising more than one signaling, and a given reference time is one of the N reference times determined by the given signaling group; a t1-th signaling in the given signaling group is used to determine the given reference time, t1 being a positive integer greater than 1.

In one subembodiment of the above embodiment, signalings in the given signaling group are arranged according to the first rule.

In one subembodiment of the above embodiment, signalings in the given signaling group are arranged in an ascending order in time domain.

In one subembodiment of the above embodiment, the t1 is pre-defined.

In one subembodiment of the above embodiment, the t1 is fixed equal to 2.

In one subembodiment of the above embodiment, the t1 is configured by an RRC signaling.

In one subembodiment of the above embodiment, the t1 is related to the first node capacity.

In one subembodiment of the above embodiment, the t1 is related to a UE capacity.

In one subembodiment of the above embodiment, a UE capacity parameter comprises the t1.

In one subembodiment of the above embodiment, the t1 is reported by the first node to a base station.

In one subembodiment of the above embodiment, the t1 is related to an SCS.

In one subembodiment of the above embodiment, the t1 is related to the t.

In one subembodiment of the above embodiment, the t1 is related to a signaling format of the given signaling group.

In one subembodiment of the above embodiment, the t1 is related to a priority of the given signaling group.

In one subembodiment of the above embodiment, when a priority of the given signaling group is high, the t1 is equal to a first reference integer; when a priority of the given signaling group is low, the t1 is equal to a second reference integer; and the first reference integer is different from the second reference integer.

In one subembodiment of the above embodiment, when a signaling format of the given signaling group is a first signaling format, the t1 is equal to a first reference integer; when a signaling format of the given signaling group is a second signaling format, the t1 is equal to a second reference integer; and the first reference integer is different from the second reference integer.

In one embodiment, N3 signaling group(s) is(are) signaling group(s) comprising more than one signaling in the N signaling groups, the target signaling group is one of the N3 signaling group(s), N3 being a positive integer not greater than the N; N3 reference time(s) in the N reference times is (are respectively) determined by the N3 signaling group(s), a target reference time is a latest reference time in the N3 reference time(s), and the target reference time is determined by the target signaling group.

In one embodiment, when the first reference time is a latest one of the N reference times, the target signaling group is the first signaling group; and when the first reference time is not a latest one of the N reference times, the target signaling group is not the first signaling group.

In one embodiment, when the first reference time is a latest one of the N reference times, the target signaling group is the first signaling group.

In one embodiment, when the first reference time is not a latest one of the N reference times, the target signaling group is not the first signaling group.

In one embodiment, one of the N reference times determined by the target signaling group is a latest one of the N reference times.

In one embodiment, when the first reference time is not a latest one of the N reference times, the target signaling group is a signaling group other than the first signaling group in the N signaling groups.

In one embodiment, the phrase that the first reference time is a latest one of the N reference times includes: any reference time other than the first reference time in the N reference times is earlier than the target reference time.

In one embodiment, the phrase that the first reference time is a latest one of the N reference times includes: N1 reference times in the N reference times is equal to the first reference time, any reference time other than the N1 reference times in the N reference times is earlier than the first reference time, N1 being a positive integer greater than 1 and less than the N.

In one embodiment, the phrase that the first reference time is a latest one of the N reference times includes: the N reference times are the same.

In one embodiment, the phrase that the first reference time is not a latest one of the N reference times includes: there exist a reference time other than the first reference time in the N reference times later than the first reference time.

In one embodiment, the phrase that the first reference time is not a latest one of the N reference times includes: a target reference time is a latest one of the N reference times, and the target reference time is later than the first reference time.

Embodiment 2

Embodiment 2 illustrates a schematic diagram of a network architecture according to the present disclosure, as shown in FIG. 2.

FIG. 2 illustrates a network architecture 200 of 5G NR, Long-Term Evolution (LTE) and Long-Term Evolution Advanced (LTE-A) systems. The NR 5G or LTE network architecture 200 may be called an Evolved Packet System (EPS) 200 or other appropriate terms. The EPS 200 may comprise one or more UEs 201, an NG-RAN 202, an Evolved Packet Core/5G-Core Network (EPC/5G-CN) 210, a Home Subscriber Server (HSS) 220 and an Internet Service 230. The EPS 200 may be interconnected with other access networks. For simple description, the entities/interfaces are not shown. As shown in FIG. 2, the EPS 200 provides packet switching services. Those skilled in the art will readily understand that various concepts presented throughout the present disclosure can be extended to networks providing circuit switching services or other cellular networks. The NG-RAN 202 comprises an NR node B (gNB) 203 and other gNBs 204. The gNB 203 provides UE 201-oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the EPC/5G-CN 210 for the UE 201. Examples of the UE 201 include cellular phones, smart phones, Session Initiation Protocol (SIP) phones, laptop computers, Personal Digital Assistant (PDA), satellite Radios, non-terrestrial base station communications, Satellite Mobile Communications, Global Positioning Systems (GPSs), multimedia devices, video devices, digital audio players (for example, MP3 players), cameras, game consoles, unmanned aerial vehicles (UAV), aircrafts, narrow-band Internet of Things (IoT) devices, machine-type communication devices, land vehicles, automobiles, wearable devices, or any other similar functional devices. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the EPC/5G-CN 210 via an S1/NG interface. The EPC/5G-CN 210 comprises a Mobility Management Entity (MME)/Authentication Management Field (AMF)/User Plane Function (UPF) 211, other MMES/AMFs/UPFs 214, a Service Gateway (S-GW) 212 and a Packet Date Network Gateway (P-GW) 213. The MME/AMF/UPF 211 is a control node for processing a signaling between the UE 201 and the EPC/5G-CN 210. Generally, the MME/AMF/UPF 211 provides bearer and connection management. All user Internet Protocol (IP) packets are transmitted through the S-GW 212, the S-GW 212 is connected to the P-GW 213. The P-GW 213 provides UE IP address allocation and other functions. The P-GW 213 is connected to the Internet Service 230. The Internet Service 230 comprises IP services corresponding to operators, specifically including Internet, Intranet, IP Multimedia Subsystem (IMS) and Packet Switching Streaming Services (PSS).

In one embodiment, the UE 201 corresponds to the first node in the present disclosure.

In one embodiment, the UE 241 corresponds to the second node in the present disclosure.

In one embodiment, the gNB 203 corresponds to the second node in the present disclosure.

Embodiment 3

Embodiment 3 illustrates a schematic diagram of an example of a radio protocol architecture of a user plane and a control plane according to one embodiment of the present disclosure, as shown in FIG. 3. FIG. 3 is a schematic diagram illustrating an embodiment of a radio protocol architecture of a user plane 350 and a control plane 300. In FIG. 3, the radio protocol architecture for a first communication node (UE, a RSU in gNB or V2X) and a second communication node (gNB, a RSU in UE or V2X), or between two UEs is represented by three layers, which are a layer 1, a layer 2 and a layer 3, respectively. which are a layer 1, a layer 2 and a layer 3, respectively. The layer 1 (L1) is the lowest layer and performs signal processing functions of various PHY layers. The L1 is called PHY 301 in the present disclosure. The layer 2 (L2) 305 is above the PHY 301, and is in charge of a link between a first communication node and a second communication node, as well as two UEs via the PHY 301. L2 305 comprises a Medium Access Control (MAC) sublayer 302, a Radio Link Control (RLC) sublayer 303 and a Packet Data Convergence Protocol (PDCP) sublayer 304. All the three sublayers terminate at the second communication node. The PDCP sublayer 304 provides multiplexing among variable radio bearers and logical channels. The PDCP sublayer 304 provides security by encrypting a packet and provides support for a first communication node handover between second communication nodes. The RLC sublayer 303 provides segmentation and reassembling of a higher-layer packet, retransmission of a lost packet, and reordering of a data packet so as to compensate the disordered receiving caused by HARQ. The MAC sublayer 302 provides multiplexing between a logical channel and a transport channel. The MAC sublayer 302 is also responsible for allocating between first communication nodes various radio resources (i.e., resource block) in a cell. The MAC sublayer 302 is also in charge of HARQ operation. The Radio Resource Control (RRC) sublayer 306 in layer 3 (L3) of the control plane 300 is responsible for acquiring radio resources (i.e., radio bearer) and configuring the lower layer with an RRC signaling between a second communication node and a first communication node device. The radio protocol architecture of the user plane 350 comprises layer 1 (L1) and layer 2 (L2). In the user plane 350, the radio protocol architecture for the first communication node and the second communication node is almost the same as the corresponding layer and sublayer in the control plane 300 for physical layer 351, PDCP sublayer 354, RLC sublayer 353 and MAC sublayer 352 in L2 layer 355, but the PDCP sublayer 354 also provides a header compression for a higher-layer packet so as to reduce a radio transmission overhead. The L2 layer 355 in the user plane 350 also includes Service Data Adaptation Protocol (SDAP) sublayer 356, which is responsible for the mapping between QoS flow and Data Radio Bearer (DRB) to support the diversity of traffic. Although not described in FIG. 3, the first communication node may comprise several higher layers above the L2 layer 355, such as a network layer (e.g., IP layer) terminated at a P-GW of the network side and an application layer terminated at the other side of the connection (e.g., a peer UE, a server, etc.).

In one embodiment, the radio protocol architecture in FIG. 3 is applicable to the first node in the present disclosure.

In one embodiment, the radio protocol architecture in FIG. 3 is applicable to the second node in the present disclosure.

In one embodiment, the second information block in the present disclosure is generated by the RRC sublayer 306.

In one embodiment, the second information block in the present disclosure is generated by the RRC sublayer 306.

In one embodiment, the second information block in the present disclosure is generated by the MAC sublayer 302.

In one embodiment, the second information block in the present disclosure is generated by the MAC sublayer 352.

In one embodiment, the N signaling groups in the present disclosure are generated by the PHY 301.

In one embodiment, the N signaling groups in the present disclosure are generated by the PHY 351.

In one embodiment, the K1 bit block set(s) in the present disclosure is(are) generated by the RRC sublayer 306.

In one embodiment, the K1 bit block set(s) in the present disclosure is(are) generated by the RRC sublayer 306.

In one embodiment, the K1 bit block set(s) in the present disclosure is(are) generated by the MAC sublayer 302.

In one embodiment, the K1 bit block set(s) in the present disclosure is(are) generated by the MAC sublayer 352.

In one embodiment, the K1 bit block set(s) in the present disclosure is(are) generated by the PHY 301.

In one embodiment, the K1 bit block set(s) in the present disclosure is(are) generated by the PHY 351.

In one embodiment, the first information block in the present disclosure is generated by the PHY 301.

In one embodiment, the first information block in the present disclosure is generated by the PHY351.

Embodiment 4

Embodiment 4 illustrates a schematic diagram of a first communication device and a second communication device in the present disclosure, as shown in FIG. 4. FIG. 4 is a block diagram of a first communication device 410 in communication with a second communication device 450 in an access network.

The first communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

The second communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

In a transmission from the first communication device 410 to the second communication device 450, at the first communication device 410, a higher layer packet from the core network is provided to a controller/processor 475. The controller/processor 475 provides a function of the L2 layer. In the transmission from the first communication device 410 to the first communication device 450, the controller/processor 475 provides header compression, encryption, packet segmentation and reordering, and multiplexing between a logical channel and a transport channel, and radio resources allocation to the second communication device 450 based on various priorities. The controller/processor 475 is also responsible for retransmission of a lost packet and a signaling to the second communication device 450. The transmitting processor 416 and the multi-antenna transmitting processor 471 perform various signal processing functions used for the L1 layer (that is, PHY). The transmitting processor 416 performs coding and interleaving so as to ensure an FEC (Forward Error Correction) at the second communication device 450, and the mapping to signal clusters corresponding to each modulation scheme (i.e., BPSK, QPSK, M-PSK, M-QAM, etc.). The multi-antenna transmitting processor 471 performs digital spatial precoding, including codebook-based precoding and non-codebook-based precoding, and beamforming on encoded and modulated symbols to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multi-carrier symbol streams. After that the multi-antenna transmitting processor 471 performs transmission analog precoding/beamforming on the time-domain multi-carrier symbol streams. Each transmitter 418 converts a baseband multicarrier symbol stream provided by the multi-antenna transmitting processor 471 into a radio frequency (RF) stream. Each radio frequency stream is later provided to different antennas 420.

In a transmission from the first communication device 410 to the second communication device 450, at the second communication device 450, each receiver 454 receives a signal via a corresponding antenna 452. Each receiver 454 recovers information modulated to the RF carrier, converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs receiving analog precoding/beamforming on a baseband multicarrier symbol stream from the receiver 454. The receiving processor 456 converts the baseband multicarrier symbol stream after receiving the analog precoding/beamforming from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any the second communication device-targeted spatial stream. Symbols on each spatial stream are demodulated and recovered in the receiving processor 456 to generate a soft decision. Then the receiving processor 456 decodes and de-interleaves the soft decision to recover the higher-layer data and control signal transmitted on the physical channel by the first communication node 410. Next, the higher-layer data and control signal are provided to the controller/processor 459. The controller/processor 459 performs functions of the L2 layer. The controller/processor 459 can be connected to a memory 460 that stores program code and data. The memory 460 can be called a computer readable medium. In the transmission from the first communication device 410 to the second communication device 450, the controller/processor 459 provides demultiplexing between a transport channel and a logical channel, packet reassembling, decryption, header decompression and control signal processing so as to recover a higher-layer packet from the core network. The higher-layer packet is later provided to all protocol layers above the L2 layer, or various control signals can be provided to the L3 layer for processing.

In a transmission from the second communication device 450 to the first communication device 410, at the second communication device 450, the data source 467 is configured to provide a higher-layer packet to the controller/processor 459. The data source 467 represents all protocol layers above the L2 layer. Similar to a transmitting function of the first communication device 410 described in the transmission from the first communication device 410 to the second communication device 450, the controller/processor 459 performs header compression, encryption, packet segmentation and reordering, and multiplexing between a logical channel and a transport channel based on radio resources allocation so as to provide the L2 layer functions used for the user plane and the control plane. The controller/processor 459 is also responsible for retransmission of a lost packet, and a signaling to the first communication device 410. The transmitting processor 468 performs modulation mapping and channel coding. The multi-antenna transmitting processor 457 implements digital multi-antenna spatial precoding, including codebook-based precoding and non-codebook-based precoding, as well as beamforming. Following that, the generated spatial streams are modulated into multicarrier/single-carrier symbol streams by the transmitting processor 468, and then modulated symbol streams are subjected to analog precoding/beamforming in the multi-antenna transmitting processor 457 and provided from the transmitters 454 to each antenna 452. Each transmitter 454 first converts a baseband symbol stream provided by the multi-antenna transmitting processor 457 into a radio frequency symbol stream, and then provides the radio frequency symbol stream to the antenna 452.

In the transmission from the second communication device 450 to the first communication device 410, the function of the first communication device 410 is similar to the receiving function of the second communication device 450 described in the transmission from the first communication device 410 to the second communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and multi-antenna receiving processor 472 collectively provide functions of the L1 layer. The controller/processor 475 provides functions of the L2 layer. The controller/processor 475 can be connected with the memory 476 that stores program code and data. The memory 476 can be called a computer readable medium. In the transmission from the second communication device 450 to the first communication device 410, the controller/processor 475 provides de-multiplexing between a transport channel and a logical channel, packet reassembling, decryption, header decompression, control signal processing so as to recover a higher-layer packet from the UE 450.

The higher-layer packet coming from the controller/processor 475 may be provided to the core network.

In one embodiment, the first node in the present disclosure comprises the second communication device 450, and the second node in the present disclosure comprises the first communication device 410.

In one subembodiment of the above embodiment, the first node is a UE, and the second node is a UE.

In one subembodiment of the above embodiment, the first node is a UE, and the second node is a relay node.

In one subembodiment of the above embodiment, the first node is a relay node, and the second node is a UE.

In one subembodiment of the above embodiment, the first node is a UE, and the second node is a base station.

In one subembodiment of the above embodiment, the first node is a relay node, and the second node is a base station.

In one subembodiment of the above embodiment, the second communication device 450 comprises: at least one controller/processor; the at least one controller/processor is responsible for HARQ operation.

In one subembodiment of the above embodiment, the first communication device 410 comprises: at least one controller/processor; the at least one controller/processor is responsible for HARQ operation.

In one subembodiment of the above embodiment, the first communication device 410 comprises: at least one controller/processor; the at least one controller/processor is responsible for error detection using ACK and/or NACK protocols as a way to support HARQ operation.

In one embodiment, the second communication device 450 comprises at least one processor and at least one memory. The at least one memory comprises computer program codes; the at least one memory and the computer program codes are configured to be used in collaboration with the at least one processor. The second communication device 450 at least: receives N signaling groups in M time-frequency resource sets; and transmits a first information block in a first time-frequency resource block; herein, the first information block comprises HARQ-ACKs associated with the N signaling groups; a first signaling group comprises a last signaling in the N signaling groups, the first signaling group is one of the N signaling groups, the N signaling groups are used to determine N reference times respectively, and a first reference time is one of the N reference times determined by the first signaling group; a target signaling group is used to determine the first time-frequency resource block, the target signaling group is one of the N signaling groups, and whether the first reference time is a latest one of the N reference times is used to determine whether the target signaling group is the first signaling group; when the first reference time is a latest one of the N reference times, the target signaling group is the first signaling group; when the first reference time is not a latest one of the N reference times, the target signaling group is not the first signaling group; M is a positive integer greater than 1, and N is a positive integer greater than 1.

In one subembodiment of the above embodiment, the second communication device 450 corresponds to the first node in the present disclosure.

In one embodiment, the second communication device 450 comprises a memory that stores a computer readable instruction program. The computer readable instruction program generates an action when executed by at least one processor. The action includes: receiving N signaling groups in M time-frequency resource sets; and transmitting a first information block in a first time-frequency resource block; herein, the first information block comprises HARQ-ACKs associated with the N signaling groups; a first signaling group comprises a last signaling in the N signaling groups, the first signaling group is one of the N signaling groups, the N signaling groups are used to determine N reference times respectively, and a first reference time is one of the N reference times determined by the first signaling group; a target signaling group is used to determine the first time-frequency resource block, the target signaling group is one of the N signaling groups, and whether the first reference time is a latest one of the N reference times is used to determine whether the target signaling group is the first signaling group; when the first reference time is a latest one of the N reference times, the target signaling group is the first signaling group; when the first reference time is not a latest one of the N reference times, the target signaling group is not the first signaling group; M is a positive integer greater than 1, and N is a positive integer greater than 1.

In one subembodiment of the above embodiment, the second communication device 450 corresponds to the first node in the present disclosure.

In one embodiment, the first communication device 410 comprises at least one processor and at least one memory. The at least one memory comprises computer program codes; the at least one memory and the computer program codes are configured to be used in collaboration with the at least one processor. The first communication device 410 at least: transmits N signaling groups in M time-frequency resource sets; and receives a first information block in a first time-frequency resource block; herein, the first information block comprises HARQ-ACKs associated with the N signaling groups; a first signaling group comprises a last signaling in the N signaling groups, the first signaling group is one of the N signaling groups, the N signaling groups are used to determine N reference times respectively, and a first reference time is one of the N reference times determined by the first signaling group; a target signaling group is used to determine the first time-frequency resource block, the target signaling group is one of the N signaling groups, and whether the first reference time is the latest one of the N reference times is used to determine whether the target signaling group is the first signaling group; when the first reference time is a latest one of the N reference times, the target signaling group is the first signaling group; when the first reference time is not a latest one of the N reference times, the target signaling group is not the first signaling group; N1 is a positive integer greater than 1, and N2 is a positive integer greater than 1.

In one subembodiment of the above embodiment, the first communication device 410 corresponds to the second node in the present disclosure.

In one embodiment, the first communication device 410 comprises a memory that stores a computer readable instruction program. The computer readable instruction program generates an action when executed by at least one processor. The action includes: transmitting N signaling groups in M time-frequency resource sets; and receiving a first information block in a first time-frequency resource block; herein, the first information block comprises HARQ-ACKs associated with the N signaling groups; a first signaling group comprises a last signaling in the N signaling groups, the first signaling group is one of the N signaling groups, the N signaling groups are used to determine N reference times respectively, and a first reference time is one of the N reference times determined by the first signaling group; a target signaling group is used to determine the first time-frequency resource block, the target signaling group is one of the N signaling groups, and whether the first reference time is a latest one of the N reference times is used to determine whether the target signaling group is the first signaling group; when the first reference time is a latest one of the N reference times, the target signaling group is the first signaling group; when the first reference time is not a latest one of the N reference times, the target signaling group is not the first signaling group; M is a positive integer greater than 1, and N is a positive integer greater than 1.

In one subembodiment of the above embodiment, the first communication device 410 corresponds to the second node in the present disclosure.

In one embodiment, at least one of the antenna 452, the receiver 454, the multi-antenna receiving processor 458, the receiving processor 456, the controller/processor 459, the memory 460, or the data source 467 is used to receive the second information block in the present disclosure.

In one embodiment, at least one of the antenna 420, the transmitter 418, the multi-antenna transmitting processor 471, the transmitting processor 416, the controller/processor 475, or the memory 476 is used to transmit the second information block in the present disclosure.

In one embodiment, at least one of the antenna 452, the receiver 454, the multi-antenna receiving processor 458, the receiving processor 456, the controller/processor 459, the memory 460, or the data source 467 is used to receive the N signaling groups in the present disclosure in the M time-frequency resource sets in the present disclosure.

In one embodiment, at least one of the antenna 420, the transmitter 418, the multi-antenna transmitting processor 471, the transmitting processor 416, the controller/processor 475, or the memory 476 is used to transmit the N signaling groups in the present disclosure in M time-frequency resource sets in the present disclosure.

In one embodiment, at least one of the antenna 452, the receiver 454, the multi-antenna receiving processor 458, the receiving processor 456, the controller/processor 459, the memory 460, or the data source 467 is used to receive the K1 bit block set(s) in the present disclosure.

In one embodiment, at least one of the antenna 420, the transmitter 418, the multi-antenna transmitting processor 471, the transmitting processor 416, the controller/processor 475, or the memory 476 is used to transmit the K1 bit block set(s) in the present disclosure.

In one embodiment, at least one of the antenna 452, the transmitter 454, the multi-antenna transmission processor 458, the transmitting processor 468, the controller/processor 459, the memory 460, or the data source 467 is used to transmit the first information block in the present disclosure in the first time-frequency resource block in the present disclosure.

In one embodiment, at least one of the antenna 420, the receiver 418, the multi-antenna receiving processor 472, the receiving processor 470, the controller/processor 475, or the memory 476 is used to receive the first information block in the present disclosure in the first time-frequency resource block in the present disclosure.

Embodiment 5

Embodiment 5 illustrates a flowchart of radio signal transmission according to one embodiment in the present disclosure, as shown in FIG. 5. In FIG. 5, a first node U01 and a second node N02 are communication nodes that transmit via an air interface. In FIG. 5, dotted boxes F1 and F2 are optional.

The first node U01 receives a second information block in step S10; receives N signaling groups in M time-frequency resource sets in step S11; receives K1 bit block set(s) in step S12; and transmits a first information block in a first time-frequency resource block in step S13.

The second node N02 transmits a second information block in step S20; transmits N signaling groups in M time-frequency resource sets in step S21; transmits K1 bit block set(s) in step S22; and receives a first information block in a first time-frequency resource block in step S23.

In Embodiment 5, the first information block comprises HARQ-ACKs associated with the N signaling groups; a first signaling group comprises a last signaling in the N signaling groups, the first signaling group is one of the N signaling groups, the N signaling groups are used by the first node U01 for determining N reference times respectively, and a first reference time is one of the N reference times determined by the first signaling group; a target signaling group is used by the first node U01 for determining the first time-frequency resource block, the target signaling group is one of the N signaling groups, and whether the first reference time is a latest one of the N reference times is used by the first node U01 for determining whether the target signaling group is the first signaling group; when the first reference time is a latest one of the N reference times, the target signaling group is the first signaling group; when the first reference time is not a latest one of the N reference times, the target signaling group is not the first signaling group; M is a positive integer greater than 1, and N is a positive integer greater than 1.

In one embodiment, the second information block is semi-statically configured.

In one embodiment, the second information block is configured by a higher-layer signaling.

In one embodiment, the second information block is configured by an RRC signaling.

In one embodiment, the second information block is configured by a MAC CE signaling.

In one embodiment, the second information block comprises an Information Element (IE) in an RRC signaling.

In one embodiment, the second information block comprises multiple IEs in an RRC signaling.

In one embodiment, the second information block comprises partial fields of an IE in an RRC signaling.

In one embodiment, the second information block and a time unit to which the first time-frequency resource block belongs in time domain are used to determine the M time-frequency resource sets.

In one embodiment, the second information block comprises a dl-DataToUL-ACK.

In one embodiment, the second information block comprises a dl-DataToUL-ACKForDCIFormat1_2.

In one embodiment, the second information block is used by the first node U01 to determine the M time-frequency resource sets and the M reference times.

In one embodiment, the second information block is used by the first node U01 to determine M time windows, and the M time-frequency resource sets respectively belong to the M time windows in time domain.

In one embodiment, the second information block is used to indicate M time windows, and the M time-frequency resource sets respectively belong to the M time windows in time domain.

In one embodiment, the second information block is used to indicate the M time-frequency resource sets.

In one embodiment, the second information block explicitly indicates the M time-frequency resource sets.

In one embodiment, the second information block implicitly indicates the M time-frequency resource sets.

In one embodiment, the second information block indicates times of repeat transmissions of PDCCH.

In one embodiment, K1 is equal to the N.

In one embodiment, K1 is less than the N.

In one embodiment, any of the K1 bit block set(s) comprises (comprise) at least one TB.

In one embodiment, any of the K1 bit block set(s) comprises (comprise) a TB.

In one embodiment, any of the K1 bit block set(s) comprises (comprise) at least one CBG.

In one embodiment, any of the K1 bit block set(s) comprises (comprise) a CBG.

In one embodiment, any of the K1 bit block set(s) comprises (comprise) at least one bit.

In one embodiment, any two signalings in a same signaling group in the K1 signaling group(s) both comprise scheduling information of a same bit block set in the K1 bit block set(s).

In one embodiment, a given bit block set is any of the K1 bit block set(s), and the scheduling information of the given bit block set comprises at least one of occupied time-domain resources, occupied frequency-domain resources, a Modulation and Coding Scheme (MCS), configuration information of DeModulation Reference Signals (DMRS), a Hybrid Automatic Repeat request (HARQ) process number, a Redundancy Version (RV), a New Data Indicator (NDI), a transmission antenna port or a corresponding Transmission Configuration Indicator (TCI) state.

In one subembodiment of the above embodiment, the configuration information of the DMRS comprises at least one of a Reference Signal (RS) sequence, a mapping mode, a DMRS type, occupied time-domain resources, occupied frequency-domain resources, occupied code-domain resources, cyclic shift, or an Orthogonal Cover Code (OCC).

Embodiment 6

Embodiment 6 illustrates a schematic diagram of determining a target signaling group, as shown in FIG. 6.

In Embodiment 6, a target reference time is a latest reference time in the N reference times in the present disclosure; when any reference time other than the target reference time in the N reference times is earlier than the target reference time, the target signaling group is one of the N signaling groups in the present disclosure used to determine the target reference time.

Embodiment 7

Embodiment 7 illustrates another schematic diagram of determining a target signaling group, as shown in FIG. 7.

In Embodiment 7, a target reference time is a latest one of the N reference times in the present disclosure; when each of N1 reference times in the N reference times is equal to the target reference time, the N1 reference times are respectively determined by N1 signaling groups in the N signaling groups in the present disclosure, N1 first-type indexes are used to determine the target signaling group out of the N1 signaling groups, and the N1 first-type indexes respectively correspond to the N1 signaling groups; N1 is a positive integer greater than 1 and not greater than the N, and each of the N1 first-type indexes is a non-negative integer.

In one embodiment, each of the N1 first-type indexes is a positive integer.

In one embodiment, the target signaling group is one of the N1 signaling groups corresponding to a largest one of the N1 first-type indexes.

In one embodiment, the first-type index comprises a serving cell index.

In one embodiment, the first-type index comprises a CORESETPoolIndex.

In one embodiment, the first-type index is used to indicate a first CORESET or a second CORESET.

In one embodiment, each of first-type indexes respectively corresponding to N2 signaling groups in the N1 signaling groups is a largest one of the N1 first-type indexes, N2 is a positive integer greater than 1 and not greater than the N1, N2 second-type indexes are used to determine the target signaling group out of the N2 signaling groups, the N2 second-type indexes respectively correspond to the N2 signaling groups, and each of the N2 second-type indexes is a non-negative integer.

In one subembodiment of the above embodiment, a value range of the second-type index comprises 0 and 1.

In one subembodiment of the above embodiment, information respectively indicated by the second-type index and the first-type index is different.

In one subembodiment of the above embodiment, the first-type index comprises a serving cell index.

In one subembodiment of the above embodiment, the second-type index comprises a CORESETPoolIndex.

In one subembodiment of the above embodiment, the second-type index is used to indicate a first CORESET and a second CORESET.

In one subembodiment of the above embodiment, the target signaling group is one of the N2 signaling groups corresponding to a largest one of the N2 second-type indexes.

Embodiment 8

Figures 8, 9, 10:
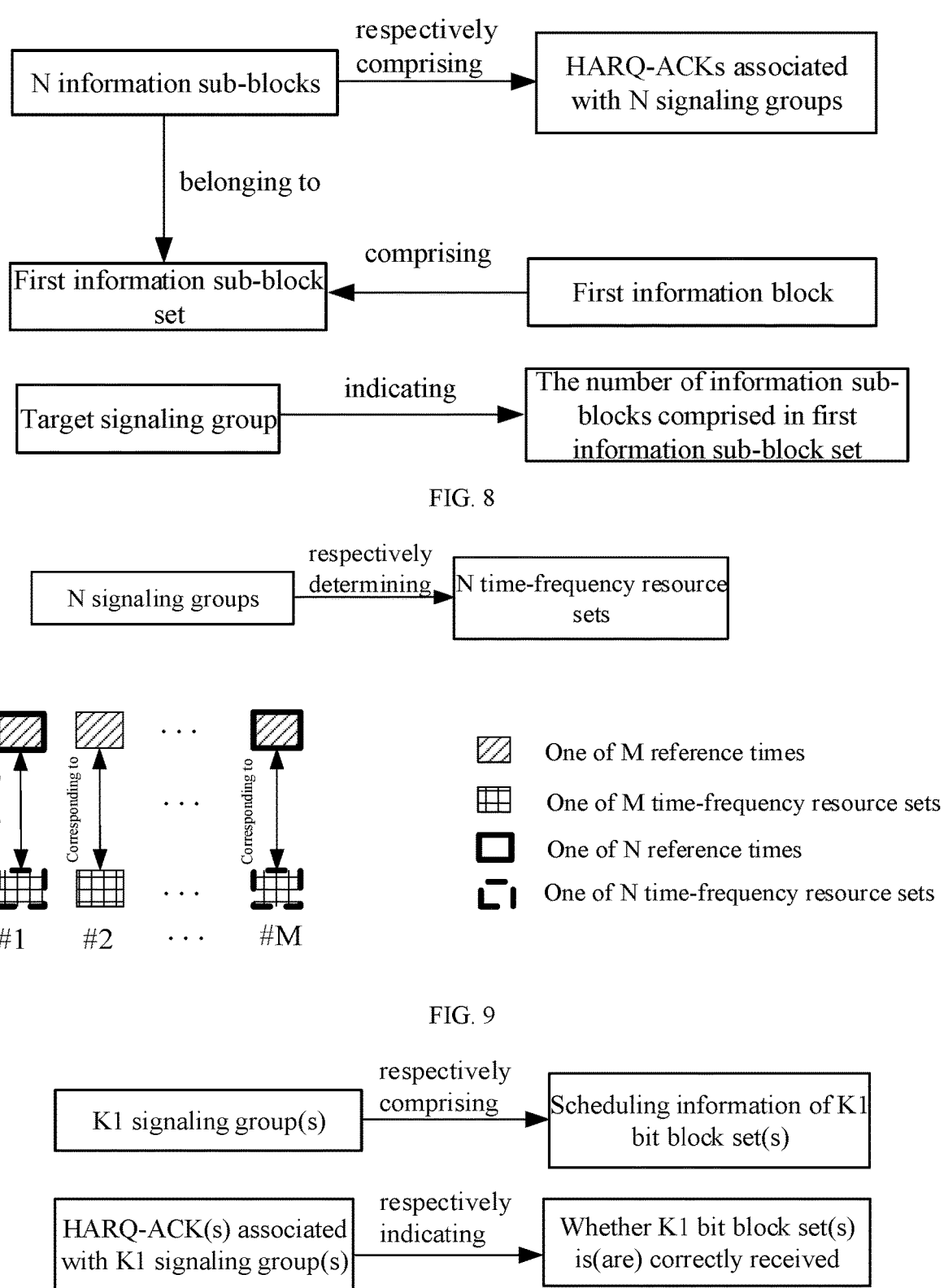
FIG. 8 illustrates a schematic diagram of a relation of a target signaling group and a first information sub-block set according to one embodiment of the present disclosure.
FIG. 9 illustrates a schematic diagram of determining N reference times according to one embodiment of the present disclosure.
FIG. 10 illustrates a schematic diagram of HARQ-ACKs associated with N signaling groups according to one embodiment of the present disclosure.

Embodiment 8 illustrates a schematic diagram of a relation between a target signaling group and a first information sub-block set, as shown in FIG. 8.

In Embodiment 8, the first information block in the present disclosure comprises a first information sub-block set, N information sub-blocks comprise HARQ-ACKs associated with the N signaling groups in the present disclosure respectively, any of the N information sub-blocks belongs to the first information sub-block set, and a number of information sub-blocks comprised in the first information sub-block set is not less than the N; the target signaling group is used to indicate the number of information sub-blocks comprised in the first information sub-block set.

In one embodiment, the first information sub-block set only comprises an HARQ-ACK.

In one embodiment, the first information block only comprises the first information sub-block set.

In one embodiment, the first information block also comprises an information sub-block other than the first information sub-block set.

In one embodiment, a number of information sub-blocks comprised in the first information sub-block set is equal to N.

In one embodiment, a number of information sub-blocks comprised in the first information sub-block set is greater than the N.

In one embodiment, the target signaling group indicates a first value, and the first value is used to determine the number of information sub-blocks comprised in the first information sub-block set.

In one embodiment, any signaling in the target signaling group indicates a first value, and the first value is used to determine the number of information sub-blocks comprised in the first information sub-block set.

In one embodiment, the target signaling group only comprises a signaling, the target signaling group comprises a first field, a value of the first field comprised in the target signaling group is equal to a first value, and the first value indicates the number of information sub-blocks comprised in the first information sub-block set.

In one embodiment, the target signaling group comprises S signalings, S being a positive integer greater than 1; any of the S signalings comprises a first field, the first field comprised in any of the S signalings indicates a first value, and the first value is used to determine the number of information sub-blocks comprised in the first information sub-block set.

In one embodiment, the first value is a positive integer.

In one embodiment, the first value is a non-negative integer.

In one embodiment, the first value is equal to a target value modulo a reference value then plus 1, the target value is equal to a non-negative integer obtained by subtracting 1 from the number of information sub-blocks comprised in the first information sub-block set, and the reference value is a positive integer.

In one embodiment, the first value is X, the number of information sub-block(s) comprised in the first information sub-block set is Y, a relation between X and Y meets $X=(Y-1) \bmod T+1$, X being a positive integer, Y being a positive integer, T being a positive integer.

In one embodiment, the first value is equal to a target value modulo a reference value, the target value is equal to a non-negative integer obtained by subtracting 1 from the number of information sub-blocks comprised in the first information sub-block set, and the reference value is a positive integer.

In one embodiment, the first value is X, the number of information sub-block(s) comprised in the first information sub-block set is Y, a relation between X and Y meets $X=(Y-1) \bmod T$, X being a non-negative integer, Y being a positive integer, T being a positive integer.

In one embodiment, the first value is total DAI.

In one embodiment, the first value is counter DAI.

In one embodiment, the target signaling group comprises S signalings, S being a positive integer greater than 1; any of the S signalings comprises a first field, the first field comprised in any of the S signalings indicates a first value, the first value is used to determine the number of information sub-blocks comprised in the first information sub-block set; the first value is a counter DAI; and total DAIS respectively indicated by any two signalings belonging to a same one of M time windows in time domain in the N signaling groups are the same.

In one embodiment, the target signaling group also indicates a third value.

In one embodiment, any signaling in the target signaling group also indicates a third value.

In one embodiment, the first field comprised in any of the S signalings also indicates a third value.

In one embodiment, the third value is a positive integer.

In one embodiment, the third value is a non-negative integer.

In one embodiment, the first value is total DAI, and the third value is counter DAI.

In one embodiment, the specific meaning of the total DAI can be found in 3GPP TS38.213, section 9.1.

In one embodiment, the specific meaning of the counter DAI can be found in 3GPP TS38.213, section 9.1.

Embodiment 9

Embodiment 9 illustrates a schematic diagram of determining N reference times, as shown in FIG. 9.

In Embodiment 9, the M time-frequency resource sets in the present disclosure respectively correspond to M reference times; the N signaling groups in the present disclosure are respectively used to determine N time-frequency resource sets out of the M time-frequency resource sets, the N reference times are reference times corresponding to the N time-frequency resource sets in the M reference times.

In one embodiment, the N time-frequency resource sets respectively comprise time-frequency resources occupied by the N signaling groups.

In one embodiment, N signalings are respectively first signalings in the N signaling groups, and the N time-frequency resource sets respectively comprise time-frequency resources occupied by the N signalings.

In one embodiment, a first signaling in a given signaling group is an earliest detected signaling in the given signaling group.

In one embodiment, signalings in a given signaling group are arranged according to a second rule, and a first signaling in the given signaling group is a signaling arranged in the first in the given signaling group.

In one embodiment, signalings in a given signaling group are indexed according to a second rule, and a first signaling in the given signaling group is a signaling with a smallest index in the given signaling group.

In one embodiment, in a given signaling group, indexes of signalings arranged in the front are smaller, and indexes of signalings arranged in the back are larger.

In one embodiment, the second rule is related to occupied frequency-domain resources and occupied time-domain resources.

In one embodiment, the second rule is related to occupied time-domain resources.

In one embodiment, the second rule is related to a monitoring occasion.

In one embodiment, the second rule is related to both a monitoring occasion and a CORESET.

In one embodiment, the second rule includes: arranged according to the order of frequency domain first and then time domain.

In one embodiment, the second rule includes: arranged according to ascending chronological order.

In one embodiment, the second rule includes: arranged according to indexes of monitoring occasions in an ascending order.

In one embodiment, the second rule includes: arranged according to start times of search space sets in an ascending order.

In one embodiment, the second rule includes: for a same monitoring occasion, a first CORESET is arranged prior to a second CORESET.

In one embodiment, the second rule includes: for start times of same search space sets, a first CORESET is arranged prior to a second CORESET.

In one embodiment, the second rule includes: for a same time, a first CORESET is arranged prior to a second CORE-SET.

In one embodiment, the M time-frequency resource sets respectively comprise the M reference times in time domain.

In one embodiment, the M reference times are respectively start times of the M time-frequency resource sets.

In one embodiment, the M reference times are respectively starting slots of the M time-frequency resource sets in time domain.

In one embodiment, the M reference times are respectively start times of starting slots of the M time-frequency resource sets in time domain.

In one embodiment, the M time-frequency resource sets respectively belong to M time windows in time domain, and the M reference times respectively belong to the M time windows.

In one embodiment, the M time-frequency resource sets respectively belong to M time windows in time domain, and the M reference times are respectively start times of the M time windows.

In one embodiment, total DAIs respectively indicated by any two signalings belonging to a same one of the M time window in time domain in the N signaling groups are the same.

In one embodiment, total DAIs respectively indicated by any two signalings belonging to different time windows of the M time window in time domain in the N signaling groups are different.

In on embodiment, total DAIs respectively indicated by any two signalings belonging to a same one of the M time window in time domain in the N signaling groups are the same; total DAIs respectively indicated by any two signalings belonging to different time windows of the M time window in time domain in the N signaling groups are different; and there exists that two signalings belonging to a same one of the N signaling groups respectively belong to two of the M time windows.

In one embodiment, counter DAIs respectively indicated by any two signalings belonging to a same one of the N signaling groups are the same, and there exist total DAIs respectively indicated by two signalings belonging to a same one of the N signaling groups being different.

In one embodiment, there exists that two signalings belonging to a same one of the N signaling groups respectively belong to two of the M time windows.

In one embodiment, the target signaling group comprises S signalings, S being a positive integer greater than 1; any of the S signalings comprises a first field, the first field comprised in any of the S signalings indicates a first value, the first value is used to determine the number of information sub-blocks comprised in the first information sub-block set; the first value is a counter DAI; total DAIs respectively indicated by any two signalings belonging to different time windows of the M time windows in time domain in the N signaling groups are different, and there exist two of the S signalings respectively belonging to different time windows of the M time windows.

In one embodiment, the target signaling group comprises S signalings, S being a positive integer greater than 1; and there exist two of the S signalings respectively belonging to different time windows of the M time windows.

In one embodiment, total DAIs respectively indicated by any two signalings belonging to different time windows of the M time windows in time domain in the N signaling groups are different, and there exist two of the S signalings respectively belonging to different time windows of the M time windows.

In one embodiment, the target signaling group comprises S signalings, S being a positive integer greater than 1; counter DAIs respectively indicated by the S signalings are the same; and there exist two of the S signalings respectively belonging to different time windows of the M time windows.

In one embodiment, the target signaling group comprises S signalings, S being a positive integer greater than 1; counter DAIs respectively indicated by the S signalings are the same; and there exist total DAIs respectively indicated by two of the S signalings being different.

In one embodiment, a second signaling group is one of the N signaling groups, the second signaling group comprises S1 signalings, S1 being a positive integer greater than 1; counter DAIs respectively indicated by the S1 signalings are the same; and there exist total DAIs respectively indicated by two of the S1 signalings being different.

In one embodiment, counter DAIs respectively indicated by the S signalings are the same; total DAIs respectively indicated by any two signalings belonging to different time windows of the M time windows in time domain in the N signaling groups are different, and there exist two of the S signalings respectively belonging to different time windows of the M time windows.

In one embodiment, the M time windows are mutually orthogonal.

In one embodiment, there exist two time windows in the M time windows being non-orthogonal.

In one embodiment, a time window comprise at least one slot.

In one embodiment, a time window comprise at least one subframe.

In one embodiment, a time window comprise at least one multicarrier symbol.

In one embodiment, the M time windows are predefined.

In one embodiment, the M time windows are pre-configured.

In one embodiment, the M time windows are configurable.

In one embodiment, the M time windows are pre-configured by a higher-layer signaling.

In one embodiment, the M time windows are pre-configured by an RRC signaling.

Embodiment 10

Embodiment 10 illustrates a schematic diagram HARQ-ACKs associated with N signaling groups, as shown in FIG. 10.

In Embodiment 10, K1 signaling group(s) in the N signaling groups comprises (respectively comprise) scheduling information of the K1 bit block set(s) in the present disclosure, the HARQ-ACK(s) associated with the K1 signaling group(s) indicates (respectively indicate) whether the K1 bit block set(s) is(are) correctly received, K1 being a positive integer not greater than the N.

Embodiment 11

Figure 11:
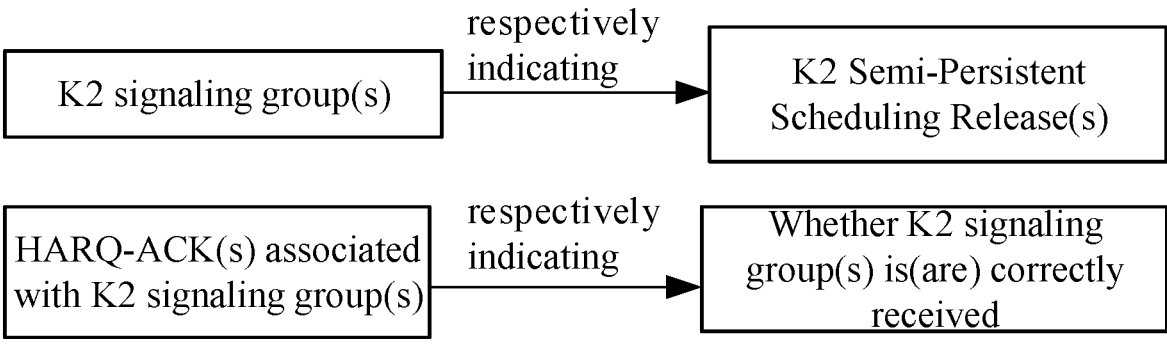
FIG. 11 illustrates a schematic diagram of HARQ-ACKs associated with N signaling groups according to another embodiment of the present disclosure.

Embodiment 11 illustrates another schematic diagram HARQ-ACKs associated with N signaling groups, as shown in FIG. 11.

In Embodiment 11, K2 signaling group(s) in the N signaling groups is (are respectively) used to indicate K2 SPS Release(s), the HARQ-ACK(s) associated with the K2 signaling group(s) indicates (respectively indicate) whether the K2 signaling group(s) is(are) correctly received, K2 being a positive integer not greater than the N.

In one embodiment, the K2 is equal to the N.

In one embodiment, the K2 is less than the N.

In one embodiment, the K1 is less than the N, and a sum of the K2 and the K1 is equal to the N.

In one embodiment, any two signalings in a same signaling group in the K2 signaling groups are used to indicate a same SPS Release in the K2 SPS Release(s).

Embodiment 12

Figure 12:
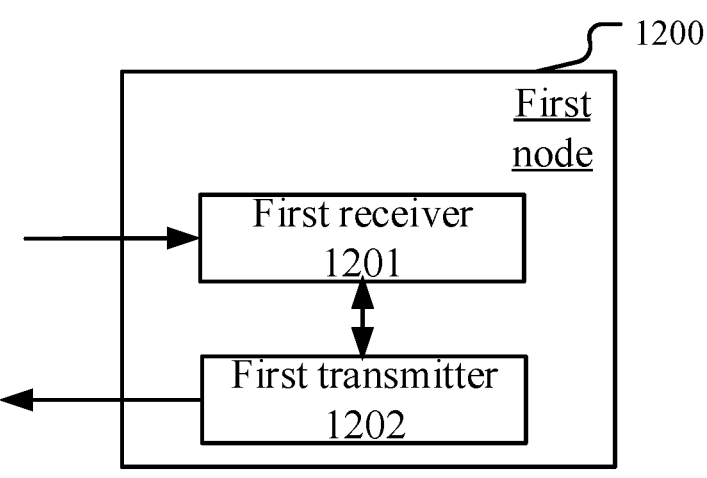
FIG. 12 illustrates a structure block diagram of a processing device in a first node according to one embodiment of the present disclosure.

Embodiment 12 illustrates a structure block diagram of a processing device in a first node, as shown in FIG. 12. In FIG. 12, a first node's processing device 1200 comprises a first receiver 1201 and a first transmitter 1202.

In one embodiment, the first node 1200 is a UE.

In one embodiment, the first node 1200 is a relay node.

In one embodiment, the first node 1200 is a vehicle-mounted communication device.

In one embodiment, the first node 1200 is a UE supporting V2X communications.

In one embodiment, the first node 1200 is a relay node supporting V2X communications.

In one embodiment, the first receiver 1201 comprises at least one of the antenna 452, the receiver 454, the multi-antenna receiving processor 458, the receiving processor 456, the controller/processor 459, the memory 460 or the data source 467 in FIG. 4 of the present disclosure.

In one embodiment, the first receiver 1201 comprises at least the first five of the antenna 452, the receiver 454, the multi-antenna receiving processor 458, the receiving processor 456, the controller/processor 459, the memory 460 or the data source 467 in FIG. 4 of the present disclosure.

In one embodiment, the first receiver 1201 comprises at least the first four of the antenna 452, the receiver 454, the multi-antenna receiving processor 458, the receiving processor 456, the controller/processor 459, the memory 460 or the data source 467 in FIG. 4 of the present disclosure.

In one embodiment, the first receiver 1201 comprises at least the first three of the antenna 452, the receiver 454, the multi-antenna receiving processor 458, the receiving processor 456, the controller/processor 459, the memory 460 or the data source 467 in FIG. 4 of the present disclosure.

In one embodiment, the first receiver 1201 comprises at least the first two of the antenna 452, the receiver 454, the multi-antenna receiving processor 458, the receiving processor 456, the controller/processor 459, the memory 460 or the data source 467 in FIG. 4 of the present disclosure.

In one embodiment, the first transmitter 1202 comprises at least one of the antenna 452, the transmitter 454, the multi-antenna transmitting processor 457, the transmitting processor 468, the controller/processor 459, the memory 460, or the data source 467 in FIG. 4 of the present disclosure.

In one embodiment, the first transmitter 1202 comprises at least the first five of the antenna 452, the transmitter 454, the multi-antenna transmitting processor 457, the transmitting processor 468, the controller/processor 459, the memory 460, or the data source 467 in FIG. 4 of the present disclosure.

In one embodiment, the first transmitter 1202 comprises at least the first four of the antenna 452, the transmitter 454, the multi-antenna transmitting processor 457, the transmitting processor 468, the controller/processor 459, the memory 460, or the data source 467 in FIG. 4 of the present disclosure.

In one embodiment, the first transmitter 1202 comprises at least the first three of the antenna 452, the transmitter 454, the multi-antenna transmitting processor 457, the transmitting processor 468, the controller/processor 459, the memory 460, or the data source 467 in FIG. 4 of the present disclosure.

In one embodiment, the first transmitter 1202 comprises at least the first two of the antenna 452, the transmitter 454, the multi-antenna transmitting processor 457, the transmitting processor 468, the controller/processor 459, the memory 460, or the data source 467 in FIG. 4 of the present disclosure.

The first receiver 1201, receives N signaling groups in M time-frequency resource sets; and the first transmitter 1202, transmits a first information block in a first time-frequency resource block;

in Embodiment 12, the first information block comprises HARQ-ACKs associated with the N signaling groups; a first signaling group comprises a last signaling in the N signaling groups, the first signaling group is one of the N signaling groups, the N signaling groups are used to determine N reference times respectively, and a first reference time is one of the N reference times determined by the first signaling group; a target signaling group is used to determine the first time-frequency resource block, the target signaling group is one of the N signaling groups, and whether the first reference time is a latest one of the N reference times is used to determine whether the target signaling group is the first signaling group; when the first reference time is a latest one of the N reference times, the target signaling group is the first signaling group; when the first reference time is not a latest one of the N reference times, the target signaling group is not the first signaling group; M is a positive integer greater than 1, and N is a positive integer greater than 1.

In one embodiment, a target reference time is a latest one of the N reference times; when any reference time other than the target reference time in the N reference times is earlier than the target reference time, the target signaling group is one of the N signaling groups used to determine the target reference time; when each of N1 reference times in the N reference times is equal to the target reference time, the N1 reference times are respectively determined by N1 signaling groups in the N signaling groups, N1 first-type indexes are used to determine the target signaling group out of the N1 signaling groups, and the N1 first-type indexes respectively correspond to the N1 signaling groups; N1 is a positive integer greater than 1 and not greater than the N, and each of the N1 first-type indexes is a non-negative integer.

In one embodiment, the first information block comprises a first information sub-block set, N information sub-blocks comprise HARQ-ACKs associated with the N signaling groups respectively, any of the N information sub-blocks belongs to the first information sub-block set, and a number of information sub-blocks comprised in the first information sub-block set is not less than the N; the target signaling group is used to indicate the number of information sub-blocks comprised in the first information sub-block set.

In one embodiment, the target signaling group comprises S signalings, S being a positive integer greater than 1; any of the S signalings comprises a first field, the first field comprised in any of the S signalings indicates a first value, the first value is used to determine the number of information sub-blocks comprised in the first information sub-block set; the first value is a counter DAI; and total DAIs respectively indicated by any two signalings in a same one of M time windows in time domain in the N signaling groups are the same.

In one embodiment, counter DAIs respectively indicated by the S signalings are the same; total DAIs respectively indicated by any two signalings belonging to different time windows of the M time windows in time domain in the N signaling groups are different, and there exist two of the S signalings respectively belonging to different time windows of the M time windows.

In one embodiment, the M time-frequency resource sets respectively correspond to M reference times; the N signaling groups are respectively used to determine N time-frequency resource sets out of the M time-frequency resource sets, the N reference times are reference times corresponding to the N time-frequency resource sets in the M reference times.

In one embodiment, the first receiver 1201 also receives a second information block; herein, the second information block is used to determine the M time-frequency resource sets.

In one embodiment, the first receiver 1202 also receives K1 bit block set(s); herein, K1 signaling group(s) in the N signaling groups comprises (respectively comprise) scheduling information of the K1 bit block set(s), the HARQ-ACK(s) associated with the K1 signaling group(s) indicates (respectively indicate) whether the K1 bit block set(s) is(are) correctly received, K1 being a positive integer not greater than the N.

In one embodiment, K2 signaling group(s) in the N signaling groups is (are respectively) used to indicate K2 SPS Release(s), the HARQ-ACK(s) associated with the K2 signaling group(s) indicates (respectively indicate) whether the K2 signaling group(s) is(are) correctly received, K2 being a positive integer not greater than the N.

In one embodiment, a given signaling group is one of the N signaling groups comprising more than one signaling, a given reference time is one of the N reference times determined by the given signaling group; a t1-th signaling in the given signaling group is used to determine the given reference time, t1 being a positive integer; the t1 is related to a capability of the first node, or, the t1 is related to a priority of the given signaling group.

Embodiment 13

Figure 13:
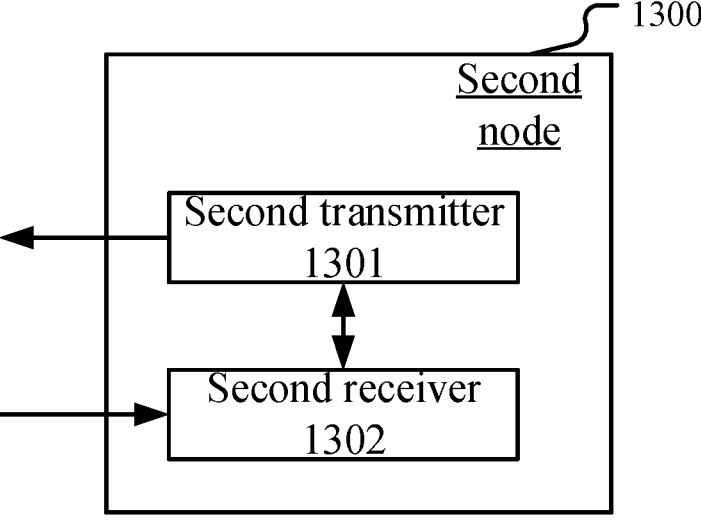
FIG. 13 illustrates a structure block diagram of a processing device in second node according to one embodiment of the present disclosure.

Embodiment 13 illustrates a structure block diagram of a processing device in a second node, as shown in FIG. 13. In FIG. 13, a second node processing device 1300 comprises a second transmitter 1301 and a second receiver 1302.

In one embodiment, the second node 1300 is a UE.

In one embodiment, the second node 1300 is a base station.

In one embodiment, the second node 1300 is a relay node.

In one embodiment, the second transmitter 1301 comprises at least one of the antenna 420, the transmitter 418, the multi-antenna transmitting processor 471, the transmitting processor 416, the controller/processor 475 or the memory 476 in FIG. 4 of the present disclosure.

In one embodiment, the second transmitter 1301 comprises at least the first five of the antenna 420, the transmitter 418, the multi-antenna transmitting processor 471, the transmitting processor 416, the controller/processor 475 or the memory 476 in FIG. 4 of the present disclosure.

In one embodiment, the second transmitter 1301 comprises at least the first four of the antenna 420, the transmitter 418, the multi-antenna transmitting processor 471, the transmitting processor 416, the controller/processor 475 or the memory 476 in FIG. 4 of the present disclosure.

In one embodiment, the second transmitter 1301 comprises at least the first three of the antenna 420, the transmitter 418, the multi-antenna transmitting processor 471, the transmitting processor 416, the controller/processor 475 or the memory 476 in FIG. 4 of the present disclosure.

In one embodiment, the second transmitter 1301 comprises at least the first two of the antenna 420, the transmitter 418, the multi-antenna transmitting processor 471, the transmitting processor 416, the controller/processor 475 or the memory 476 in FIG. 4 of the present disclosure.

In one embodiment, the second receiver 1302 comprises at least one of the antenna 420, the receiver 418, the multi-antenna receiving processor 472, the receiving processor 470, the controller/processor 475 or the memory 476 in FIG. 4 of the present disclosure.

In one embodiment, the second receiver 1302 comprises at least the first five of the antenna 420, the receiver 418, the multi-antenna receiving processor 472, the receiving processor 470, the controller/processor 475 or the memory 476 in FIG. 4 of the present disclosure.

In one embodiment, the second receiver 1302 comprises at least the first four of the antenna 420, the receiver 418, the multi-antenna receiving processor 472, the receiving processor 470, the controller/processor 475 or the memory 476 in FIG. 4 of the present disclosure.

In one embodiment, the second receiver 1302 comprises at least the first three of the antenna 420, the receiver 418, the multi-antenna receiving processor 472, the receiving processor 470, the controller/processor 475 or the memory 476 in FIG. 4 of the present disclosure.

In one embodiment, the second receiver 1302 comprises at least the first two of the antenna 420, the receiver 418, the multi-antenna receiving processor 472, the receiving processor 470, the controller/processor 475 or the memory 476 in FIG. 4 of the present disclosure.

The second transmitter 1301 transmits N signaling groups in M time-frequency resource sets; and the second receiver 1302 receives a first information block in a first time-frequency resource block;

in Embodiment 13, the first information block comprises HARQ-ACKs associated with the N signaling groups; a first signaling group comprises a last signaling in the N signaling groups, the first signaling group is one of the N signaling groups, the N signaling groups are used to determine N reference times respectively, and a first reference time is one of the N reference times determined by the first signaling group; a target signaling group is used to determine the first time-frequency resource block, the target signaling group is one of the N signaling groups, and whether the first reference time is a latest one of the N reference times is used to determine whether the target signaling group is the first signaling group; when the first reference time is a latest one of the N reference times, the target signaling group is the first signaling group; when the first reference time is not a latest one of the N reference times, the target signaling group is not the first signaling group; M is a positive integer greater than 1, and N is a positive integer greater than 1.

In one embodiment, a target reference time is a latest one of the N reference times; when any reference time other than the target reference time in the N reference times is earlier than the target reference time, the target signaling group is one of the N signaling groups used to determine the target reference time; when each of N1 reference times in the N reference times is equal to the target reference time, the N1 reference times are respectively determined by N1 signaling groups in the N signaling groups, N1 first-type indexes are used to determine the target signaling group out of the N1 signaling groups, and the N1 first-type indexes respectively correspond to the N1 signaling groups; N1 is a positive integer greater than 1 and not greater than the N, and each of the N1 first-type indexes is a non-negative integer.

In one embodiment, the first information block comprises a first information sub-block set, N information sub-blocks comprise HARQ-ACKs associated with the N signaling groups respectively, any of the N information sub-blocks belongs to the first information sub-block set, and a number of information sub-blocks comprised in the first information sub-block set is not less than the N; the target signaling group is used to indicate the number of information sub-blocks comprised in the first information sub-block set.

In one embodiment, the target signaling group comprises S signalings, S being a positive integer greater than 1; any of the S signalings comprises a first field, the first field comprised in any of the S signalings indicates a first value, the first value is used to determine the number of information sub-blocks comprised in the first information sub-block set; the first value is a counter DAI; and total DAIs respectively indicated by any two signalings in a same one of M time windows in time domain in the N signaling groups are the same.

In one embodiment, counter DAIs respectively indicated by the S signalings are the same; total DAIs respectively indicated by any two signalings belonging to different time windows of the M time windows in time domain in the N signaling groups are different, and there exist two of the S signalings respectively belonging to different time windows of the M time windows.

In one embodiment, the M time-frequency resource sets respectively correspond to M reference times; the N signaling groups are respectively used to determine N time-frequency resource sets out of the M time-frequency resource sets, the N reference times are reference times corresponding to the N time-frequency resource sets in the M reference times.

In one embodiment, the second transmitter 1301 also transmits a second information block; herein, the second information block is used to determine the M time-frequency resource sets.

In one embodiment, the second transmitter 1301 also transmits K1 bit block set(s); herein, K1 signaling group(s) in the N signaling groups comprises (respectively comprise) scheduling information of the K1 bit block set(s), the HARQ-ACK(s) associated with the K1 signaling group(s) indicates (respectively indicate) whether the K1 bit block set(s) is(are) correctly received, K1 being a positive integer not greater than the N.

In one embodiment, K2 signaling group(s) in the N signaling groups is (are respectively) used to indicate K2 SPS Release(s), the HARQ-ACK(s) associated with the K2 signaling group(s) indicates (respectively indicate) whether the K2 signaling group(s) is(are) correctly received, K2 being a positive integer not greater than the N.

In one embodiment, a given signaling group is one of the N signaling groups comprising more than one signaling, a given reference time is one of the N reference times determined by the given signaling group; a t1-th signaling in the given signaling group is used to determine the given reference time, t1 being a positive integer; the t1 is related to a capability of a transmitting node of the first information block, or, the t1 is related to a priority of the given signaling group.

The ordinary skill in the art may understand that all or part of steps in the above method may be implemented by instructing related hardware through a program. The program may be stored in a computer readable storage medium, for example Read-Only Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The first node in the present disclosure includes but is not limited to mobile phones, tablet computers, notebooks, network cards, low-consumption equipment, enhanced MTC (eMTC) terminals, NB-IOT terminals, vehicle-mounted communication equipment, aircrafts, diminutive airplanes, unmanned aerial vehicles, telecontrolled aircrafts and other wireless communication devices. The second node in the present disclosure includes but is not limited to mobile phones, tablet computers, notebooks, network cards, low-consumption equipment, eMTC terminals, NB-IOT terminals, vehicle-mounted communication equipment, aircrafts, diminutive airplanes, unmanned aerial vehicles, telecontrolled aircrafts and other wireless communication devices. The UE or terminal in the present disclosure includes but is not limited to mobile phones, tablet computers, notebooks, network cards, low-consumption equipment, eMTC terminals, NB-IOT terminals, vehicle-mounted communication equipment, aircrafts, diminutive airplanes, unmanned aerial vehicles, telecontrolled aircrafts, etc. The base station or network side equipment in the present disclosure includes but is not limited to macro-cellular base stations, micro-cellular base stations, home base stations, relay base station, eNB, gNB, Transmitter Receiver Point (TRP), GNSS, relay satellites, satellite base stations, space base stations and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A User Equipment (UE), comprising:
   a receiver configured to receive a plurality of signaling groups in corresponding time-frequency resource sets, wherein a first signaling group comprises a last signaling of the plurality of signaling groups; and
   a transmitter configured to transmit an information block in a time-frequency resource block,
   wherein the information block comprises at least one hybrid acknowledgement repeat request acknowledgment (HARQ-ACK) associated with at least one of the plurality of signaling groups,
   wherein the plurality of signaling groups are used to determine a respective plurality of reference times, and a first reference time is one of the plurality of reference times determined based on the first signaling group, wherein a target signaling group of the plurality of signaling groups is used to determine the time-frequency resource block, and one of the reference times determined based on the target signaling group is a latest reference time in the plurality of reference times, wherein whether the first reference time is the latest reference time of the plurality of reference times is used to determine whether the target signaling group is the first signaling group, wherein, when the first reference time is the latest reference time of the plurality of reference times, the target signaling group is the first signaling group, and wherein, when the first reference time is not the latest reference time of the plurality of reference times, the target signaling group is not the first signaling group.

2. The UE of claim 1, wherein a target reference time is the latest reference time of the plurality of reference times, wherein when any reference time other than the target reference time in the plurality of reference times is earlier than the target reference time, wherein the target signaling group is one of the plurality of signaling groups used to determine the target reference time; when each of one or more reference times in the plurality of reference times is equal to the target reference time, the one or more reference times are respectively determined based on one or more signaling groups in the plurality of signaling groups, one or more first-type indexes are used to determine the target signaling group out of the one or more signaling groups, wherein the one or more first-type indexes respectively correspond to the one or more signaling groups; wherein each of the one or more first-type indexes is a non-negative integer; or, a target reference time is the latest reference time of the plurality of reference times, wherein when any reference time other than the target reference time in the plurality of reference times is earlier than the target reference time, the target signaling group is one of the plurality of signaling groups used to determine the target reference time, wherein when each of one or more reference times in the plurality of reference times is equal to the target reference time, the one or more reference times are respectively determined based on one or more signaling groups in the plurality of signaling groups, one or more first-type indexes are used to determine the target signaling group out of the one or more signaling groups, and the one or more first-type indexes respectively correspond to the one or more signaling groups, wherein each of the one or more first-type indexes is a non-negative integer, wherein each of first-type indexes respectively corresponding to at least a portion of signaling groups in the one or more signaling groups is a largest one of the one or more first-type indexes, wherein one or more second-type indexes are used to determine the target signaling group out of the at least the portion of signaling groups, the one or more second-type indexes respectively correspond to the at least the portion of signaling groups, and each of the one or more second-type indexes is a non-negative integer.

3. The UE of claim 1, wherein the information block comprises an information sub-block set, wherein a plurality of information sub- blocks comprise HARQ-ACKs associated with the plurality of signaling groups respectively, wherein any of the plurality of information sub-blocks belongs to the information sub-block set, wherein a number of information sub-blocks included in the information sub-block set is not less than a number of the plurality of signaling groups, and wherein the target signaling group is used to indicate the number of information sub-blocks included in the information sub-block set.

4. The UE of claim 1, wherein the information block comprises an information sub-block set, wherein a plurality of information sub-blocks comprise HARQ-ACKs associated with the plurality of signaling groups respectively, wherein any of the plurality of information sub-blocks belongs to the information sub- block set, and a number of information sub-blocks included in the information sub-block set is not less than a number of the plurality of signaling groups, wherein the target signaling group comprises a plurality of signalings, wherein any of the plurality of signalings include a first field indicating a value, wherein the value is used to determine a number of information sub-blocks included in the information sub-block set, wherein the first value is a counter Downlink assignment index (DAI).

5. The UE of claim 1, wherein the target signaling group comprises a plurality of signalings, wherein each includes a same downlink control information (DCI).

6. A base station comprising:

a transmitter configured to transmit a plurality of signaling groups in corresponding time-frequency resource sets, wherein a first signaling group comprises a last signaling of the plurality of signaling groups; and a receiver configured to receive an information block in a first time-frequency resource block, wherein the information block comprises at least one hybrid acknowledgement repeat request acknowledgment (HARQ-ACK) associated with at least one of the plurality signaling groups, wherein the plurality of signaling groups are used to determine a respective plurality of reference times, and a first reference time is one of the plurality of reference times determined based on the first signaling group, wherein a target signaling group of the plurality of signaling groups is used to determine the time-frequency resource block, the target signaling group is one of the plurality of signaling groups, and one of the reference times determined based on the target signaling group is a latest reference time in the plurality of reference times, wherein whether the first reference time is the latest reference time of the plurality of reference times is used to determine whether the target signaling group is the first signaling group, wherein, when the first reference time is the latest reference time of the plurality of reference times, the target signaling group is the first signaling group, and wherein, when the first reference time is not the latest reference time of the plurality of reference times, the target signaling group is not the first signaling group.

7. The base station of claim 6, wherein a target reference time is the latest reference time of the plurality of reference times, wherein when any reference time other than the target reference time in the plurality of reference times is earlier than the target reference time, wherein the target signaling group is one of the plurality of signaling groups used to determine the target reference time, wherein when each of one or more reference times in the plurality of reference times is equal to the target reference time, the one or more reference times are respectively determined based on one or more signaling groups in the plurality of signaling groups, wherein one or more first-type indexes are used to determine the target signaling group out of the one or more signaling groups, and the one or more first- type indexes respectively correspond to the one or more signaling groups, wherein each of the one or more first-type indexes is a non-negative integer; or, a target reference time is the latest reference time of the plurality of reference times, wherein when any reference time other than the target reference time in the plurality of reference times is earlier than the target reference time, the target signaling group is one of the plurality of signaling groups used to determine the target reference time; when each of one or more reference times in the plurality of reference times is equal to the target reference time, the one or more reference times are respectively determined based on one or more signaling groups in the plurality of signaling groups, one or more first-type indexes are used to determine the target signaling group out of the one or more signaling groups, and the one or more first- type indexes respectively correspond to the one or more signaling groups;, wherein each of the one or more first-type indexes is a non-negative integer, wherein each of first-type indexes respectively corresponding to at least a portion of signaling groups in the one or more signaling groups is a largest one of the one or more first-type indexes,, wherein one or more second-type indexes are used to determine the target signaling group out of the at least the portion of signaling groups, the one or more second-type indexes respectively correspond to the at least the portion of signaling groups, and each of the one or more second-type indexes is a non-negative integer.

8. The base station of claim 6, wherein the information block comprises an information sub-block set, wherein a plurality of information sub-blocks comprise HARQ-ACKs associated with the plurality of signaling groups respectively, any of the plurality of information sub-blocks belongs to the information sub-block set, wherein a number of information sub-blocks included in the information sub-block set is not less than a number of the plurality of signaling groups.

9. The base station of claim 6, wherein the target signaling group comprises a plurality of signalings, wherein each of the plurality of signalings includes a same downlink control information (DCI).

10. A method performed by a User Equipment (UE), the method comprising:

receiving a plurality of signaling groups in corresponding time-frequency resource sets, wherein a first signaling group comprises a last signaling of the plurality of signaling groups; and transmitting an information block in a time-frequency resource block, wherein the information block comprises at least one hybrid acknowledgement repeat request acknowledgement (HARQ-ACK) associated with at least one of the plurality of signaling groups, wherein the first signaling group is one of the plurality of signaling groups, wherein the plurality of signaling groups are used to determine a respective plurality of reference times, and a first reference time is one of the plurality of reference times determined based on the plurality of signaling groups, wherein a target signaling group is used to determine the time frequency resource block, wherein the target signaling group is one of the plurality of signaling groups, and one of the plurality of reference times determined based on the target signaling group is a latest reference time in the plurality of reference times, wherein, whether the first reference time is the latest reference time of the plurality of reference times is used to determine whether the target signaling group is the first signaling group, wherein, when the first reference time is the latest reference time of the plurality of reference times, the target signaling group is the first signaling group, and wherein, when the first reference time is not the latest reference time of the plurality of reference times, the target signaling group is not the first signaling group.

11. The method of claim 10, wherein a target reference time is the latest reference time of the plurality of reference times; when any reference time other than the target reference time in the plurality of reference times is earlier than the target reference time, the target signaling group is one of the plurality of signaling groups used to determine the target reference time, wherein when each of one or more reference times in the plurality of reference times is equal to the target reference time, the one or more reference times are respectively determined by one or more signaling groups in the plurality of signaling groups, one or more first-type indexes are used to determine the target signaling group out of the one or more signaling groups, and the one or more first-type indexes respectively correspond to the one or more signaling groups, wherein each of the one or more first-type indexes is a non-negative integer; or, a target reference time is the latest reference time of the plurality of reference times; when any reference time other than the target reference time in the plurality of reference times is earlier than the target reference time, the target signaling group is one of the plurality of signaling groups used to determine the target reference time;

when each of one or more reference times in the plurality of reference times is equal to the target reference time, the one or more reference times are respectively determined by one or more signaling groups in the plurality of signaling groups, one or more first-type indexes are used to determine the target signaling group out of the one or more signaling groups, and the one or more first-type indexes respectively correspond to the one or more signaling groups, wherein each of the one or more first- type indexes is a non-negative integer, wherein each of first-type indexes respectively corresponding to at least a subset of signaling groups in the one or more signaling groups is a largest one of the one or more first-type indexes, one or more second-type indexes are used to determine the target signaling group out of the at least the subset of the one or more signaling groups, wherein the one or more second-type indexes respectively correspond to the at least the subset of the one or more signaling groups, and wherein each of the one or more second-type indexes is a non-negative integer.

12. The method of claim 10, wherein the information block comprises an information sub-block set, wherein a plurality of information sub-blocks comprise HARQ-ACKs associated with the plurality of signaling groups respectively, wherein any of the plurality of information sub-blocks belongs to the information sub-block set, wherein a number of information sub-blocks comprised in the information sub-block set is not less than at number of the plurality of signaling groups, wherein the target signaling group is used to indicate the number of information sub-blocks included in the information sub-block set.

13. The method of claim 10, wherein the information block comprises an information sub-block set, wherein a plurality of information sub-blocks comprise HARQ-ACKs associated with the plurality of signaling groups respectively, wherein any of the plurality of information sub-blocks belongs to the information sub-block set, wherein a number of information sub-blocks included in the information sub-block set is not less than a number of the plurality of signaling groups, wherein the target signaling group comprises a plurality of signalings, wherein any of the plurality of signalings includes a first field, wherein the first field included in any of the plurality of signalings indicates a value, wherein the value is used to determine the number of information sub-blocks included in the information sub-block set, wherein the value is a counter Downlink assignment index (DAI).

14. The method of claim 10, wherein the target signaling group comprises plurality of signalings, wherein each of the plurality of signalings comprises a same downlink control information (DCI).

* * * * *